US012759708B2

(12) United States Patent
Vötter et al.

(10) Patent No.: US 12,759,708 B2

(45) Date of Patent: Oct. 13, 2026

(54) LAVATORY ARRANGEMENT FOR AN AIRCRAFT CABIN WITH ENCLOSED SUPPLEMENTAL SPACE PARTITION PROVIDED IN FRONT OF LAVATORY ARRANGEMENT

(71) Applicant: Airbus Operations GmbH, Hamburg (DE)

(72) Inventors: Axel Vötter, Hamburg (DE); Tjark Miles, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 19/189,390

(22) Filed: Apr. 25, 2025

(65) Prior Publication Data

US 2025/0333171 A1 Oct. 30, 2025

(30) Foreign Application Priority Data

Apr. 29, 2024 (EP) .................................... 24173070
Nov. 28, 2024 (DE) ..................... 10 2024 135 293.0

(51) Int. Cl.
*B64D 11/02* (2006.01)

(52) U.S. Cl.
CPC .................................... *B64D 11/02* (2013.01)

(58) Field of Classification Search
CPC ..... B64D 11/02; B64D 11/04; B64D 11/0023; B64D 45/0026; B64D 45/0028;
(Continued)

(56) References Cited

U.S. PATENT DOCUMENTS 9,045,231 B2 * 6/2015 Swain .................. E06B 9/0638
9,308,997 B2 * 4/2016 Scown .................. B64D 11/02
(Continued)

FOREIGN PATENT DOCUMENTS

DE 60312420 T2 12/2007
EP 2708467 A2 3/2014
(Continued)

OTHER PUBLICATIONS

European Search Report for corresponding European Patent Application No. 24173070.4 dated Oct. 7, 2024.

*Primary Examiner* — Arfan Y. Sinaki

(74) *Attorney, Agent, or Firm* — Greer, Burns & Crain, Ltd.

(57) ABSTRACT

A lavatory arrangement for an aircraft cabin includes a first lavatory compartment accessible from an aisle area via a first door, and a second lavatory compartment accessible from the aisle area via a second door. A movable bi-functional partition wall is arranged between the first and second lavatory compartments. The bi-functional partition wall is movable between primary and secondary positions. In the primary position, the bi-functional partition wall separates the first lavatory compartment from the second lavatory compartment, and in the secondary position, the bi-functional partition wall is brought into a position outside the first and second lavatory compartments, in which secondary position the first lavatory compartment and the second lavatory compartment provide an enlarged common lavatory. In the secondary position, the bi-functional partition wall is arranged at least partly outside the lavatory arrangement and within the aisle area outside the first lavatory compartment and the second lavatory compartment.

15 Claims, 15 Drawing Sheets

(58) Field of Classification Search
CPC . E06B 3/92; E06B 3/921; E06B 3/922; B63B 2029/145
See application file for complete search history.

(56) References Cited

U.S. PATENT DOCUMENTS

| | | | | |
|---|---|---|---|---|
| 9,656,751 | B2 | 5/2017 | Schliwa et al. | |
| 11,618,570 | B2 * | 4/2023 | Roeder | B64D 11/02 244/118.5 |
| 11,884,401 | B2 * | 1/2024 | Bradshaw | B64D 11/02 |
| 12,258,127 | B2 * | 3/2025 | McIntosh | B64D 11/02 |
| 12,397,913 | B2 * | 8/2025 | Meyer | B64C 1/1469 |
| 2003/0155466 | A1 | 8/2003 | Wentland et al. | |
| 2005/0125891 | A1 * | 6/2005 | Stratmann | E04H 1/1216 4/661 |
| 2014/0077033 | A1 | 3/2014 | Scown et al. | |
| 2014/0123571 | A1 | 5/2014 | Swain | |
| 2014/0291446 | A1 | 10/2014 | Reams et al. | |
| 2015/0136903 | A1 | 5/2015 | Schliwa et al. | |
| 2016/0039522 | A1 | 2/2016 | Koyama et al. | |
| 2022/0212774 | A1 * | 7/2022 | Eisele | E04H 1/1266 |
| 2022/0212801 | A1 * | 7/2022 | Bradshaw | B64D 11/02 |

FOREIGN PATENT DOCUMENTS

| | | | |
|---|---|---|---|
| EP | 2974960 | A1 | 1/2016 |
| EP | 4008635 | A1 | 6/2022 |
| WO | 2011101385 | A2 | 8/2011 |
| WO | 2012110643 | A1 | 8/2012 |

* cited by examiner

LAVATORY ARRANGEMENT FOR AN AIRCRAFT CABIN WITH ENCLOSED SUPPLEMENTAL SPACE PARTITION PROVIDED IN FRONT OF LAVATORY ARRANGEMENT

CROSS-REFERENCES TO RELATED APPLICATIONS

This application claims the benefit of the European Application No. 24173070.4, filed on Apr. 29, 2024, and of the German Patent Application No. 10 2024 135 293.0 filed on Nov. 28, 2024, the entire disclosures of which are incorporated herein by way of reference.

FIELD OF THE INVENTION

In a first part, the present invention relates to a lavatory arrangement for an aircraft cabin, to a cabin for an aircraft, to an aircraft and to a method for transforming a lavatory arrangement for an aircraft cabin.

In a second part, the present invention relates to a divider wall for an aircraft lavatory arrangement in a cabin of an aircraft, to a lavatory arrangement for an aircraft cabin, to a kit for converting a lavatory arrangement with two adjacent lavatories into a PRM-suitable enlarged lavatory, to a cabin for an aircraft, to an aircraft and to a method for transforming a lavatory arrangement for an aircraft cabin.

BACKGROUND OF THE INVENTION

Lavatories for passengers are installed on board an aircraft to provide sanitary service functions to passengers. In view of space economic concerns, aircraft lavatories are small in order to have maximum space available for passenger seating. However, passengers with reduced mobility (PRMs), in particular when using a wheelchair, may require larger lavatory spaces. In WO 2011/101385 A2, a solution with a movable partition is provided. By moving the partition into an open position, two lavatories are combined to form one larger compartment that can then be used by a PRM. Further, WO 2012/110643 A1 provides a similar solution within a modular design. However, it has been shown that a demand for further improved spatial situations exists. As a further note, it has been shown that an increasing demand exists for further optimization of exploitation of the available space.

SUMMARY OF THE INVENTION

There may thus be a need for lavatories with improved use of available space.

It should be noted that the following described aspects of the invention apply also for the aircraft cabin, for the cabin for an aircraft, for the aircraft and for the method for transforming a lavatory arrangement for an aircraft cabin. It should further be noted that described aspects apply also for the divider wall for an aircraft lavatory arrangement in a cabin of an aircraft, for the lavatory arrangement for an aircraft cabin, for the kit for converting a lavatory arrangement with two adjacent lavatories into a PRM-suitable enlarged lavatory, for the cabin for an aircraft, for the aircraft and for the method for transforming a lavatory arrangement for an aircraft cabin.

According to a first aspect of the present invention, a lavatory arrangement for an aircraft cabin is provided. The arrangement comprises a first lavatory compartment accessible from an aisle area via a first door, and a second lavatory compartment accessible from the aisle area via a second door. A movable bi-functional partition wall is arranged between the first lavatory compartment and the second lavatory compartment. The bi-functional partition wall is movable between a primary position and a secondary position. In the primary position, the bi-functional partition wall separates the first lavatory compartment from the second lavatory compartment, and in the secondary position, the bi-functional partition wall is brought into a position outside the first and second lavatory compartments, in which secondary position the first lavatory compartment and the second lavatory compartment provide an enlarged common lavatory. In the secondary position, the bi-functional partition wall is arranged at least partly outside the lavatory arrangement and within the aisle area outside the first lavatory compartment and the second lavatory compartment.

As an effect, the lavatory space available inside is maximized.

According to an example, in the secondary position, the partition wall is at least partly enclosing a part of the aisle area in front of the lavatory arrangement providing an additional separated space as an enlargement to the common lavatory.

According to an example, in the secondary position, the partition wall is arranged extending towards a monument provided on an opposite side of the aisle area such that an additional space is provided in front of the first or second door separated from an adjacent aisle or seating space, which additional space is provided as an enlargement to the common lavatory.

According to an example, the partition wall comprises a main wall panel and an extension segment on its distal edge to extend an effective length of the partition wall in the secondary position. The extension segment is movable from a stored position to an extended position. In a first option, the extension segment is a pivoting segment attached to the main panel pivotably around a vertical axis. In a second option, the extension segment is a translating segment attached to a distal front end of the main panel translatable in a telescoping manner.

According to an example, a movable bridging segment is provided on the monument provided on the opposite side of the aisle area. The bridging segment is movable between a parked position and a deployed position. The partition wall is connectable to the bridging segment when the partition wall is in its secondary position and the bridging segment is in its deployed position.

According to an example, the partition wall comprises at least two wall panel segments connected by a vertical hinge connection. In the secondary position, the partition wall is extracted from the arrangement and folded along the vertical hinge connection and attached with its distal end such that an enclosed supplemental space partition is provided in front of the first door or the second door, which supplemental space section is provided as an apsis-like enlargement to the common lavatory.

According to an example, the partition wall comprises at least two wall panel segments connected by a vertical hinge connection. In the secondary position, the partition wall is extracted from the arranged folded along the vertical hinge connection and attached with its distal end to a cabin wall structure arranged to the side of the first or the second lavatory such that a supplemental space section adjacent to the first or second door is provided, which supplemental space is provided as an enlargement to the common lavatory.

According to an example, in the secondary position, the partition wall is arranged extending from the lavatory arrangement to a monument provided on an opposite side of the aisle area. For achieving the secondary position, in the completely pulled out state the partition wall is movable with its proximal edge from a location between the first and the second door towards a location on the opposite side of the first and the second door. Further, in the secondary position, the partition wall is connected with its proximal end to a portion of the lavatory arrangement that is arranged on a lateral side of the first or the second door such that an enlarged additional space is provided in front of the first and second door separated from an adjacent aisle or seating space, which additional space is provided as an enlargement to the common lavatory.

According to an example, in the secondary position, the partition wall is arranged in front of the first or the second lavatory door. As an option, the partition wall comprises two segments that are foldable connected along a vertical axis to fold in front of the first or second door in the secondary position.

According to an example, the partition wall comprises extendable closure segments on its upper edge. The closure segments can be extracted in the secondary position to enclose the additional separated space towards above.

According to the first aspect of the present invention, also a cabin for an aircraft is provided. The cabin comprises at least one passenger seating zone with a plurality of passenger seats. The cabin also comprises at least one aisle zone for allowing movement of the passengers inside the cabin. The cabin further comprises at least one lavatory monument. The at least one lavatory monument comprises at least one lavatory arrangement.

According to an example, the at least one aisle zone comprises at least one longitudinally arranged aisle. The first and second lavatory compartments are accessible from the aisle.

According to an example, an entry zone is provided to be arranged next to an aircraft door; the entry zone comprising an entry aisle area. The first and second lavatory compartments are accessible from the entry aisle area.

According to the first aspect of the present invention, also an aircraft is provided. The aircraft comprises a fuselage and a cabin space arranged within the fuselage. In a first option, it is provided within the cabin space at least one lavatory arrangement according to one of the examples above. In a second option, it is provided within the cabin space a cabin according to one of the examples above.

According to the first aspect of the present invention, also a method for transforming a lavatory arrangement for an aircraft cabin is provided. The method comprises the following steps:

- Arranging a lavatory arrangement comprising a first lavatory compartment accessible from an aisle area via a first door, and a second lavatory compartment accessible from the aisle area via a second door; and
- Moving a bi-functional partition wall arranged between the first lavatory compartment and the second lavatory compartment from a primary position, in which the bi-functional partition wall separates the first lavatory compartment from the second lavatory compartment, to a secondary position; to move the partition wall, the wall is released and then moved to provide the enlarged lavatory, and further placed in the aisle area where the partition wall is fixed; in the secondary position, the bi-functional partition wall is brought into a position outside the first and second lavatory compartments; in the secondary position, the first lavatory compartment and the second lavatory compartment provide an enlarged common lavatory; and in the secondary position, the bi-functional partition wall is arranged at least partly outside the lavatory arrangement and within the aisle area outside the first lavatory compartment and the second lavatory compartment.

In an example, the step of moving the partition wall in the secondary position comprises at least partly enclosing a part of the aisle area in front of the lavatory arrangement providing an additional separated space as an enlargement to the common lavatory for the use by passengers with reduced mobility.

According to an aspect, the partition wall is a modifiable wall that acts as two different functions in two different locations.

According to an aspect, a double lavatory with two toilet spaces is provided that can be turned into an enlarged lavatory with an increased user space by moving a partition wall between the two toilet spaces outside the lavatory and enclosing an aisle space outside the lavatory to make this space usable as additional private user space. Thus, not only the space of the two toilet spaces is provided, e.g., for use by passengers with reduced mobility, but further space is provided in addition.

According to an aspect, a partition wall is provided that allows one to transform the two lavatory spaces, i.e., the two single toilet or lavatory compartments, into one enlarged common lavatory with increased available user space.

According to a second aspect of the present invention, a divider wall for an aircraft lavatory arrangement in a cabin of an aircraft is provided. The divider wall comprises a primary wall panel, a secondary wall panel and a fitting assembly. The primary wall panel is configured to be fixedly arranged between a first and a second lavatory of a double lavatory arrangement. The secondary wall panel is configured to be removably arranged between the first and the second lavatory such that in an attached first position, the secondary wall panel and the primary wall panel provide a separation between the first and the second lavatory. The secondary wall panel is movable to a detached second position outside the lavatory arrangement in which second position a separation of the first and the second lavatory is cancelled. The fitting assembly is configured to removably mount the secondary wall panel in the first position to at least one of the group comprising: a lavatory enclosure and the primary wall panel.

As an effect, the lavatory can be transformed in a facilitated manner while ensuring maximum use of space inside the enlarged common lavatory.

According to an example, the fitting assembly is configured to removably fix the secondary wall panel in the second position to, e.g., a cabin facing side of the lavatory enclosure and/or another monument within the cabin.

In an option, provided in addition or as alternative, the secondary wall panel comprises a first panel segment and a second panel segment. The first panel segment and the second panel segment are movably connected to each other.

According to an example, the first panel segment and the second panel segment are symmetric along a vertical axis of the vertical hinge.

According to the second aspect of the present invention, also a lavatory arrangement for an aircraft cabin is provided. The arrangement comprises a first lavatory compartment accessible from an aisle area, and a second lavatory compartment accessible from the aisle area. A divider wall according to one of the examples above is arranged between the first lavatory compartment and the second lavatory compartment. In the first position, the divider wall separates the first lavatory compartment from the second lavatory compartment. In the second position, the secondary wall panel is brought outside the first and second lavatory compartments, in which second position the first lavatory compartment, and the second lavatory compartment provide an enlarged common lavatory.

According to an example, the first lavatory compartment is accessible from the aisle area via a first door, and the second lavatory compartment is accessible from the aisle area via a second door. In the second position, the secondary wall panel is arranged extending, e.g., from the lavatory compartment, towards a monument provided on an opposite side of the aisle area such that an additional space is provided in front of the first or second door separated from an adjacent aisle or seating space, which additional space is provided as an enlargement to the common lavatory.

In an option, provided in addition or as alternative, in the second position, the secondary wall panel is attached to an opened distal edge of the first or second lavatory door.

According to the second aspect of the present invention, also a kit for converting a lavatory arrangement with two adjacent lavatories into a PRM-suitable enlarged lavatory is provided. The kit comprises a divider wall according to one of the examples above configured to replace an existing rigid divider wall between the two adjacent lavatories. The kit also comprises a primary fitting to fixedly install the primary wall panel inside the lavatory arrangement.

According to an example, the fitting assembly of the divider wall comprises at least one holding device that is configured to removably mount the secondary wall panel in the second position to a structure like a cabin facing side of the lavatory enclosure and/or another monument within the cabin.

According to the second aspect of the present invention, also a cabin for an aircraft is provided. The cabin comprises at least one passenger seating zone with a plurality of passenger seats, at least one aisle zone for allowing movement of the passengers inside the cabin and at least one lavatory monument. The at least one lavatory monument comprises at least one lavatory arrangement according to one of the examples above.

According to the second aspect of the present invention, also an aircraft is provided. The aircraft comprises a fuselage and a cabin space arranged within the fuselage. Within the cabin space, it is provided i) at least one lavatory arrangement according to one of the examples above, or ii) an aircraft cabin according to one of the examples above.

According to the second aspect of the present invention, also a method for transforming a lavatory arrangement for an aircraft cabin is provided. The method comprises the following steps:

Arranging a lavatory arrangement that comprises a first lavatory compartment accessible from an aisle area via a first door and a second lavatory compartment accessible from the aisle area via a second door; a divider wall is arranged between the first lavatory compartment and the second lavatory compartment;

Releasing a fitting assembly that removably mounts the secondary wall panel in the first position to at least one of the group comprising: a lavatory enclosure and the primary wall panel; and Bringing a secondary wall panel of the divider wall from a first position, in which the divider wall separates the first lavatory compartment from the second lavatory compartment, to a second position, in which the secondary wall panel is outside the first and second lavatory compartments, in which second position the first lavatory compartment and the second lavatory compartment provide an enlarged common lavatory.

According to an aspect, the present invention relates to transforming a separation of two adjacent lavatories in an aircraft to provide a larger common lavatory. The divider wall is a modifiable wall that acts as two different functions in two different locations.

According to an aspect, a double lavatory with two toilet spaces is provided that can be turned into an enlarged lavatory with an increased user space by moving a part of a divider wall between the two toilet spaces outside the lavatory and enclosing an aisle space outside the lavatory to make this space usable as additional private user space. Thus, not only the space of the two toilet spaces is provided, e.g., for use by passengers with reduced mobility, but further space is provided in addition.

A technical benefit is that a specific folding mechanism of the divider wall inside the lavatory is not necessary. Furthermore, by freely moving the wall panel outside the lavatory, it is avoided to block items and space inside the lavatory. The divider wall panel to be removed can be provided with a rather simple detach mechanism.

An economic benefit is that the detachable divider wall creates additional private space in the aircraft while using it in the PRM mode. Current layouts of aircraft can be kept without losing seat rows for a PRM suitable lavatory, even when being DOT2 compliant.

The detachable wall panel is easy to use by the staff members and provides a more sturdy, reliable, lighter solution compared to folding or sliding mechanisms.

According to an aspect, a divider wall that divides two adjacent lavatories can partly be detached completely from the lavatory housing structure and can be brought outside the lavatory. Outside the lavatory it could be attached to the opened lavatory door at one side and to another cabin module, e.g., partition, galley, lavatory etc. on the other side of an aisle area. The result of this “stored” position of the divider wall panel is an additional private space, which is beneficial for PRM use.

In an option, the removable divider wall panel has a hinge in order to make it foldable for better handling and in order to compensate tolerances in the “visual barrier” mode.

According to an aspect, a divider wall of a lavatory comprises two panels, from which one is detachable. In a first, so-to-speak common scenario, the divider wall is closed, and two separate lavatories are provided. In this state, the second wall panel is attached to the lavatory housing structure. In an interim state, the second wall panel is detached from the lavatory housing structure, folded and taken outside the lavatory. In a second state, the second wall panel is detached from the lavatory housing structure and attached to an opened lavatory door at one side and attached to a cabin module at the outer side, e.g., a partition, galley or other lavatory. For PRM use, the lavatory doors can both be closed, or one can be opened.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1A:
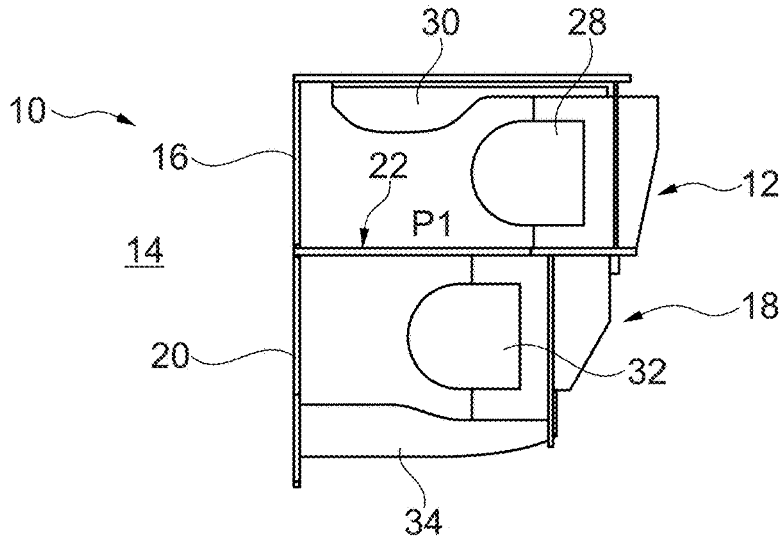
FIG. 1*a* schematically shows an example of a lavatory arrangement with a first and a second lavatory compartment and a movable partition wall in a first state in a horizontal plan.

Certain embodiments will now be described in greater detail with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as “at least one of”, when preceding a list of elements, modify the entire list of elements and do not modify the individual elements of the list.

Figure 1B:
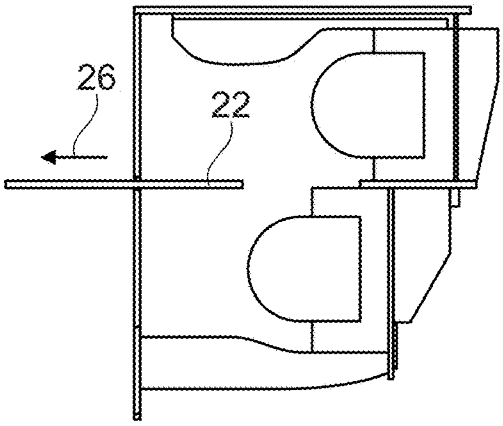
FIG. 1*b* shows the example of FIG. 1*a* in a state during movement of the partition wall.
Figure 1C:
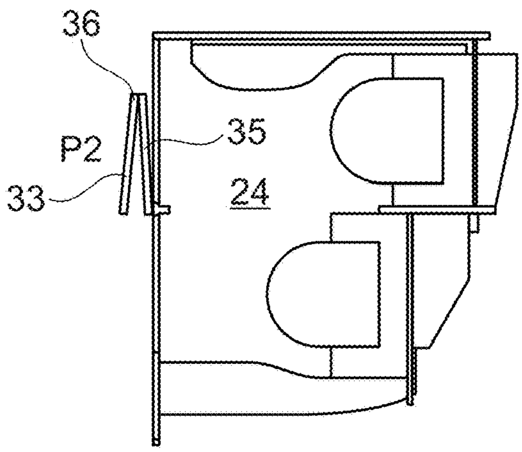
FIG. 1*c* shows the example of FIG. 1*a* in a second state.

Aspect I: FIGS. 1*a*-1*c* schematically show an example of a lavatory arrangement 10. The lavatory arrangement 10 comprises a first lavatory compartment 12 accessible from an aisle area 14 via a first door 16. The lavatory arrangement 10 also comprises a second lavatory compartment 18 accessible from the aisle area via a second door 20. A movable bi-functional partition wall 22 is arranged between the first lavatory compartment 12 and the second lavatory compartment 18. The bi-functional partition wall 22 is movable between a primary position P1 and a secondary position P2. In the primary position P1, the bi-functional partition wall 22 separates the first lavatory compartment 12 from the second lavatory compartment 18, and in the secondary position P2, the bi-functional partition wall 22 is brought into a position outside the first and second lavatory compartments 12, 18, in which secondary position P2 the first lavatory compartment 12 and the second lavatory compartment 18 provide an enlarged common lavatory 24. In the secondary position P2, the bi-functional partition wall 22 is arranged at least partly outside the lavatory arrangement 10 and within the aisle area 14 outside the first lavatory compartment 12 and the second lavatory compartment 18.

FIG. 1*a* shows the partition wall 22 in the primary position P1.

FIG. 1*b* shows the example of FIG. 1*a* in a state during movement of the partition wall 22. The movement, e.g., a translational movement followed by further movement, like pivoting, is indicated by an arrow 26.

FIG. 1*c* shows the example of FIG. 1*a* in the secondary position P2.

The first lavatory compartment 12 has a first toilet 28 and a first sink 30 or washbasin. The second lavatory compartment 18 has a second toilet 32 and a second sink 34 or washbasin.

As an example, the enlarged common lavatory 24 is provided for the use by passengers with reduced mobility.

The term "lavatory compartment" relates to an enclosed space having installations of a lavatory such as a toilet, a urinal, a sink, a mirror or a waste bin. The lavatory compartment can also be referred to as lavatory, toilet room, restroom or passenger service room. The lavatory compartment can also be referred to as toilet space.

The term "aisle area" relates to parts of the cabin provided for access by passengers and crew, movement onboard of passengers and crew, movement of service units like trolleys for onboard service. The aisle area is usually adjacent to seating areas having passenger seats. The aisle area can also be referred to as corridor arrangement.

The term "partition wall" relates to a wall separating the spaces of the first lavatory compartment and the second lavatory compartment, i.e., of the first and second toilet spaces.

The term "bi-functional" relates to the wall being able to move between two positions fulfilling two different purposes.

The term "primary position" relates to a first or main position for the use of the lavatories. The primary position can also be referred to as the dual-toilet use position.

The term "secondary position" relates to a second or auxiliary position for the use of the lavatories. The secondary position can also be referred to as the PRM-toilet use position.

The term "common lavatory" relates to the enlarged toilet space in which both toilets are enclosed, but only one is actually usable.

The term "outside the lavatory arrangement" relates to the partition wall being moved out of the interior and in front of the housing of the lavatory arrangement.

In the secondary position, the bi-functional partition wall is brought into a position outside the lavatory arrangement.

The enlarged common lavatory is configured for the use of the lavatory by passengers with reduced mobility (PRM), e.g., passengers that are using a wheelchair. For the use of a lavatory by a PRM, a transfer from the wheelchair onto a toilet seat and from there back to the wheelchair must be possible. Besides additional handles and grip portions throughout the cabin, also more space must be provided for this use scenario. For the further use of a lavatory by a PRM, also space for a support person may be needed.

In order to save space, the lavatory compartments are configured for standard use, allowing minimal space occupying layouts. However, these are too small for use by PRMs. For providing larger lavatory compartments that are suitable for being used by PRMs, two lavatory compartments are combined by removing the partition wall. Instead of folding and storing the wall inside the lavatory, the wall is moved out of the lavatory compartment and fixed in a different position. Thus, the space available inside the lavatory compartment is maximized.

The enlarged common lavatory allows the use of a wheelchair. Further, also space for a support person is provided by the enlarged common lavatory.

In an option, at least one of the first and second lavatory compartments comprises a toilet.

In one example, the first lavatory compartment comprises a toilet; the second lavatory compartment may comprise another facility like a sink, a urinal, a table or the like.

In another example, the first lavatory compartment comprises a toilet and the second lavatory compartment also comprises a toilet.

In addition, the first or the second lavatory compartment or both the first lavatory compartment and the second lavatory compartment comprise a sink in addition. In an option, a urinal can be provided in addition to a toilet, in one or both of the first and second lavatory compartment.

In FIGS. 1*a*-1*c*, the partition wall 22 is provided with a central hinge 36 such that it can be folded outside the lavatory compartments, as indicated in FIG. 1*c*.

In an option, shown in FIGS. 1*a*-1*c*, in the secondary position P2, the partition wall 22 is arranged in front of the first or the second lavatory door 16, 20. As an option, the partition wall 22 comprises two segments 33, 35 that are foldable connected along a vertical axis 36 to fold in front of the first or second door 16, 20 in the secondary position P2.

For transforming from the first position into the second position, the partition wall is pulled out of the lavatory arrangement into the aisle space in front of the first and second door. The partition wall is either pulled out completely and then folded, or gradually folded, once the first segment has been pulled out. Once in the folded state, a fixation can be provided to secure the wall segments in the folded state attached to the lavatory arrangement.

In an option, in the completely pulled out state, the partition wall maintains connected to the lavatory arrangement with its proximal end.

The term distal relates to the part of the partition wall that is moved out from the lavatory position first. The term proximal relates to the part of the partition wall that is moved out from the lavatory position last.

Instead of stowing the partition wall inside the lavatory monument, this variation aims to stow the partition wall outside the monument by sliding the wall outside and fold and stow it outside.

In an option, in the secondary position P2, the partition wall 22 is at least partly enclosing a part of the aisle area 14 in front of the lavatory arrangement 10 providing an additional separated space as an enlargement 42 (see the following examples) to the common lavatory 24.

As an example, the additional separated space is provided as an enlargement to the common lavatory for the use by passengers with reduced mobility.

The term "enlargement" relates to an added space portion increasing the available space.

The separated space is provided as a private space.

Instead of stowing the partition wall inside the lavatory monument, in this variation the slid out partition wall is fixed in a manner that it creates additional space for the PRM assist person.

The partition wall can also be referred to as separation wall or divider wall.

In an option, the partition wall is provided with a sliding mechanism inside the lavatory compartment and is pivotably supported outside the lavatory compartment.

As an example, the partition wall slides out of the lavatory and locks into adjacent module. This provides additional private space for PRM transfer.

In an example, the lavatory door opens to the outside, i.e., towards the aisle area.

As an option, the lavatory door opens such that in view of a possible emergency situation, the door does not open against a stream of evacuating passengers such that these run into the obstructing door. Rather, the door opens in direction of stream of passengers such that these would re-close the lavatory door.

In another example, the lavatory door is a folding door that folds within the door opening.

In a further example, the lavatory door opens to the inside, i.e., towards the lavatory compartment.

The term aisle area relates to space in the cabin used for passenger and crew movement in the cabin. The aisle area relates to the main aisles commonly arranged in longitudinal direction of an aircraft, for example one or two or more aisles separating the two or more seating zones. The aisle area also relates to the aisle sections in transverse direction, connecting different main aisles or providing access to the aircraft doors, to galley sections and lavatories, the cockpit door, and also internal staircases on board the aircraft.

Figure 2A:
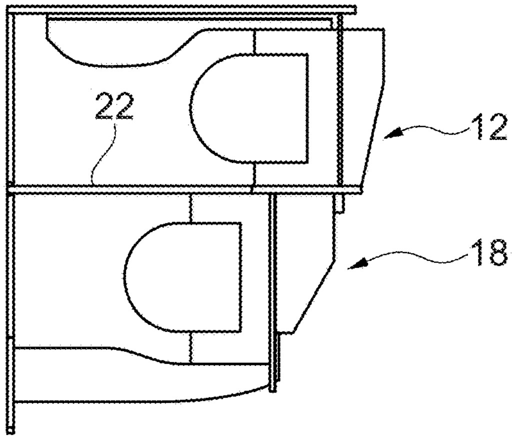
FIG. 2*a* shows a second example of a lavatory arrangement with a movable partition wall in a first state.
Figure 2B:
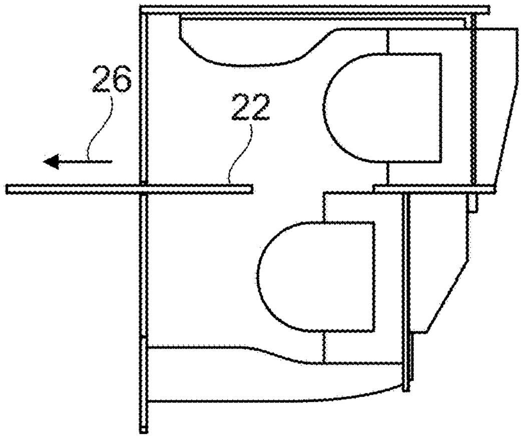
FIG. 2*b* shows the example of FIG. 2*a* in a state during movement of the partition wall.
Figure 2C:
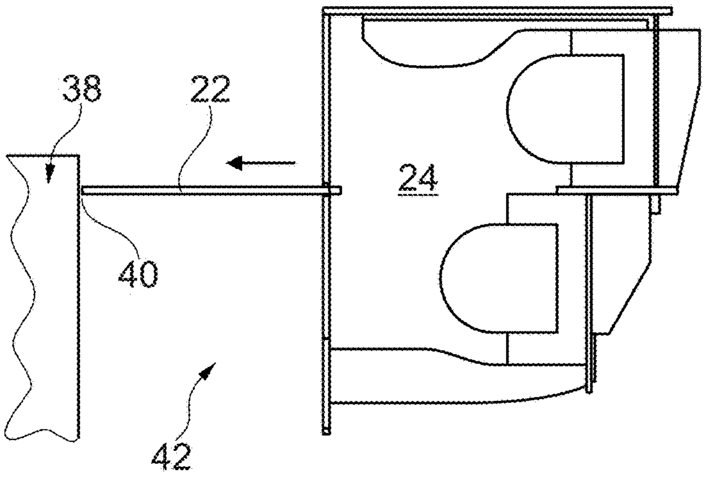
FIG. 2*c* shows the example of FIG. 2*a* in a second state providing an example of an enlargement to the common lavatory.

FIGS. 2*a*-2*c* show a second example of the lavatory arrangement 10 with the movable partition wall 22 in a first state. In the secondary position P2, the partition wall 22 is arranged extending towards a monument 38 provided on an opposite side of the aisle area, e.g., an entry/exit area in case of the lavatory arrangement being placed next to an aircraft door, such that the additional space 42 is provided in front of the first or second door separated from an adjacent aisle or seating space, which additional space 42 is provided as an enlargement to the common lavatory 24.

For example, the movable partition wall 22 is connected to the monument 38 by abutting against a respective abutting zone 40 at the monument 38.

FIG. 2*a* shows the partition wall 22 in the primary position P1.

FIG. 2*b* shows the example of FIG. 2*a* in a state during movement of the partition wall 22. The movement, e.g., a translational movement followed by further movement, like pivoting, is indicated by the arrow 26.

FIG. 2*c* shows the example of FIG. 2*a* in the secondary position P2.

For transforming from the first position P1 into the second position P2, the partition wall 22 is pulled out of the lavatory arrangement into the aisle space in front of the first and second door. In an option, the partition wall 22 is then connected to the monument provided on the opposite side of the aisle area.

In an option, the distal end of the partition wall 22 is temporarily fixable to the monument 38.

The monument can be a partition wall, a galley, a lavatory or a stowage space.

The partition wall 22 is transferred from the primary position P1 to the secondary position P2 in a translating movement.

In an option, the partition wall is provided as a rigid one-piece wall segment.

In an option, the partition wall is temporarily locked to the monument provided on the opposite side.

In an option, in the completely pulled out state, the partition wall maintains connected to the lavatory arrangement with its proximal end.

In an option, in the completely pulled out state, the partition wall maintains connected to the lavatory arrangement with its proximal end to a portion of the lavatory arrangement that is arranged between the first and the second door.

Figure 3A:
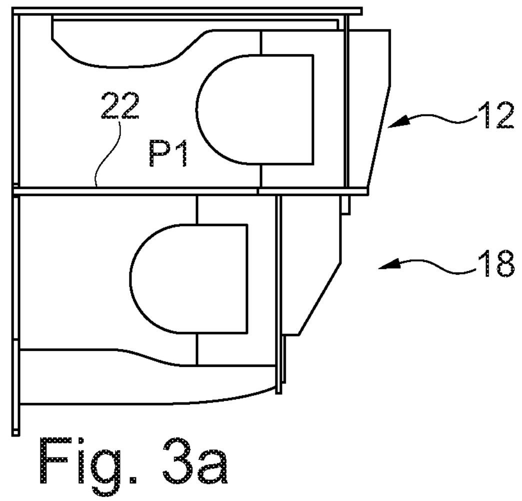
FIG. 3*a* shows a third example of a lavatory arrangement with a movable partition wall in a first state.
Figure 3B:
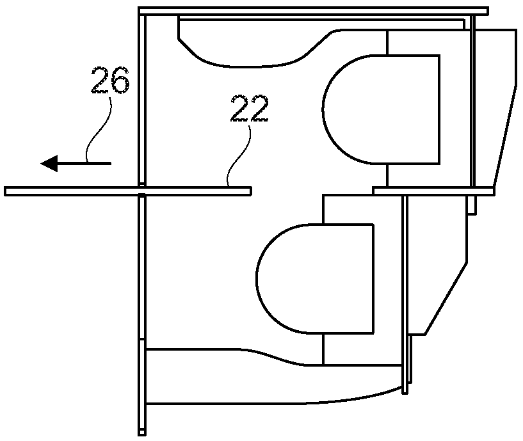
FIG. 3*b* shows the example in a state during movement of the partition wall.
Figure 3C:
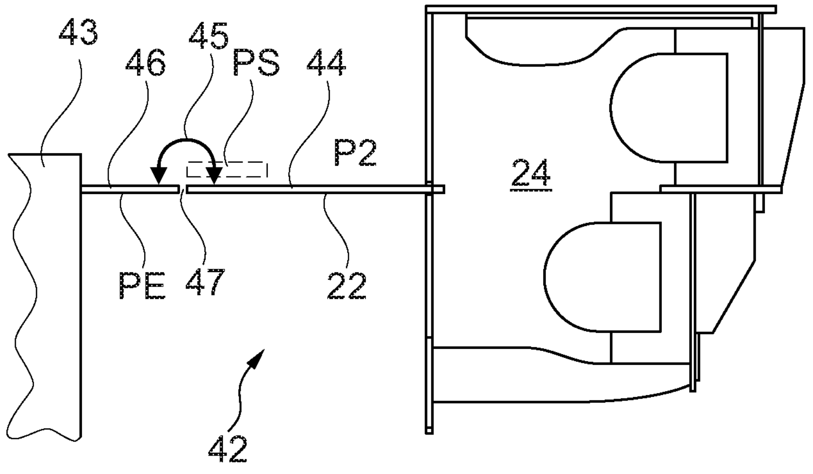
FIG. 3*c* shows the example in a second state providing another example of an enlargement to the common lavatory.

FIGS. 3*a*-3*c* show a third example of the lavatory arrangement 10 with the movable partition 22 wall in a first state. The partition wall 22 comprises a main wall panel 44 and an extension segment 46 on its distal edge to extend an effective length of the partition wall in the secondary position P2. The extension segment 46 is movable from a stored position PS to an extended position PE. In a first option, the extension segment 46 is a pivoting segment attached to the main panel pivotably around a vertical axis 47. An arrow 45 indicates the pivoting movement. In a second option, the extension segment 46 is a translating segment attached to a distal front end of the main panel translatable in a telescoping manner (not shown).

In the secondary position P2, the partition wall 22 is arranged extending towards a monument 43 provided on an opposite side of the aisle area, e.g., an entry/exit area in case of the lavatory arrangement being placed next to an aircraft door, such that the additional space 42 is provided in front of the first or second door separated from an adjacent aisle or seating space, which additional space 42 is provided as an enlargement to the common lavatory 24.

The monument 43 can be a partition wall, a galley, a lavatory or a stowage space.

In an option, the distal end of the partition wall 22, e.g., the extension segment 46, is temporarily fixable to the monument 43.

FIG. 3*a* shows the partition wall 22 in the primary position P1.

FIG. 3*b* shows the example of FIG. 3*a* in a state during movement of the partition wall 22. The movement, e.g., a translational movement followed by further movement, like pivoting, is indicated by the arrow 26.

FIG. 3*c* shows the example of FIG. 3*a* in the secondary position P2.

The term "main wall panel" relates to the larger wall part forming the separation when in the primary position.

The term "extension segment" relates to a smaller wall part only used when in the secondary position. The extension segment so-to-speak increases the length of the partition wall.

The term "stored position" relates to a position when the panel is not used.

The term "extended position" relates to a position when the panel is used.

The term "pivoting" relates to a rotational movement around a vertical axis.

The term "translating" relates to a linear sliding movement.

For transforming from the first position into the second position, the partition wall is pulled out of the lavatory arrangement into the aisle space in front of the first and second door. The extension segment is then unfolded or extracted. In an option, the extension segment is then connected to the monument provided on the opposite side of the aisle area.

In an example, the pivoting segment is pivotable from the stored position to the extended position. In an option, a recess is provided in the main panel for at least partly accommodating the pivoting segment in the stored position.

In an example, the translating segment is translatable from the stored position to the extended position. In an option, a pocket is provided in the main panel for at least partly accommodating the pivoting segment in the stored position.

In an option, in the completely pulled out state, the partition wall maintains connected to the lavatory arrangement with its proximal end.

In an example, an additional flap is attached on the partition wall in order to cover more distance, if applicable.

In another option, the partition wall comprises a main wall panel with a reduction segment on its distal or proximal edge to reduce the effective length of the partition wall in the secondary position. The reduction segment is retractable from an extended partition position to a retracted position. The reduction segment is a pivoting segment attached to the main panel pivotably around a vertical axis, or a translating segment attached to a distal front end of the main panel translatable in a telescoping manner.

Figure 4A:
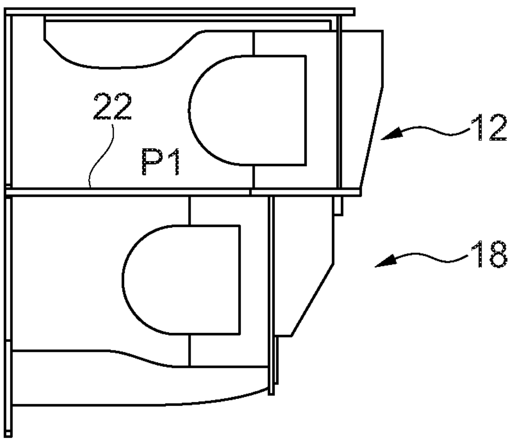
FIG. 4*a* shows a fourth example of a lavatory arrangement with a movable partition wall in a first state.
Figure 4B:
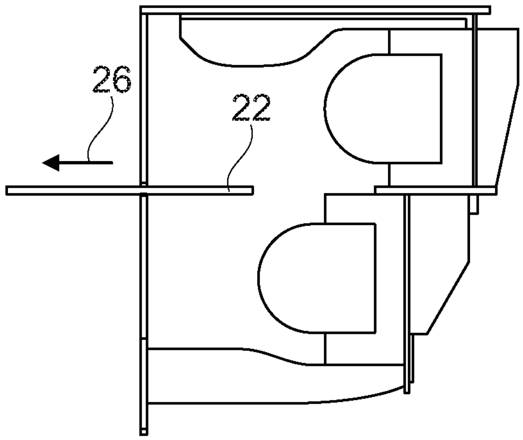
FIG. 4*b* shows the example in a state during movement of the partition wall.
Figure 4C:
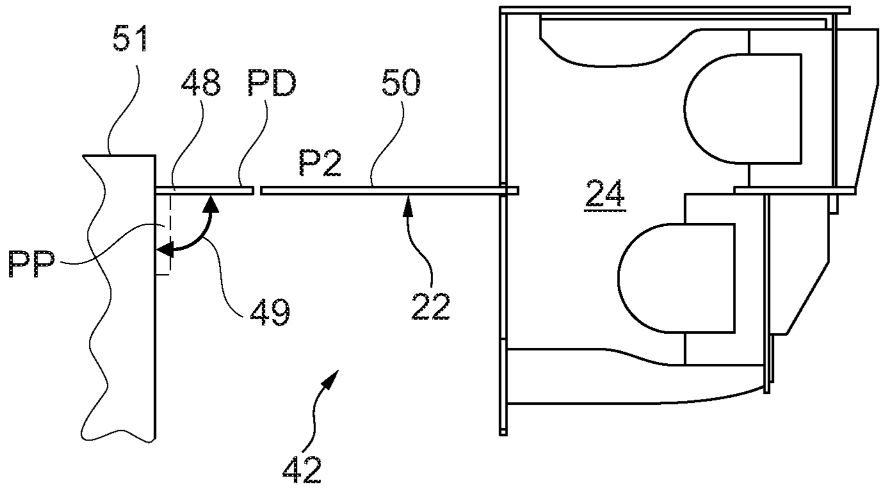
FIG. 4*c* shows the example in a second state providing a further example of an enlargement to the common lavatory.

FIGS. 4*a*-4*c* show a fourth example of the lavatory arrangement 10 with the movable partition wall 22. A movable bridging segment 48 is provided on a monument 51 provided on the opposite side of the aisle area, e.g., an entry/exit area in case of the lavatory arrangement being placed next to an aircraft door. The bridging segment 48 is movably attached to the monument 51. The bridging segment 48 is movable between a parked position PP and a deployed position PD, e.g., around a vertical pivoting axis. A second arrow 49 indicates the pivoting movement. The partition wall 22 is connectable to the bridging segment by its main panel 50 when the partition wall 22 is in its secondary position P2 and the bridging segment 48 is in its deployed position PD.

In the secondary position P2, the partition wall 22 is arranged extending towards the monument 51 such that the additional space 42 is provided in front of the first or second door separated from an adjacent aisle or seating space, which additional space 42 is provided as an enlargement to the common lavatory 24.

The monument 51 can be a partition wall, a galley, a lavatory or a stowage space.

In an option, the distal end of the partition wall 22 is temporarily fixable to the monument 51 via the bridging segment 48.

FIG. 4*a* shows the partition wall 22 in the primary position P1, in a first state.

FIG. 4*b* shows the example of FIG. 4*a* in a state during movement of the partition wall 22. The movement, e.g., a translational movement followed by further movement, like pivoting, is indicated by the arrow 26.

FIG. 4*c* shows the example of FIG. 4*a* in the secondary position P2.

The term "bridging segment" relates to a part of the wall that covers a gap between the partition wall and the opposite monument.

The term "parked position" relates to a position when the segment is not in use.

The term "deployed position" relates to a position when the segment is in use.

For transforming from the first position into the second position, the partition wall is pulled out of the lavatory arrangement into the aisle space in front of the first and second door. The extension segment is unfolded or extracted. This can take place at the same time or independently, e.g., before or after pulling out the partition wall. In an option, the extension segment and the partition wall are then connected to each other.

In an option, in the completely pulled out state, the partition wall maintains connected to the lavatory arrangement with its proximal end.

In an example, an additional flap is attached on adjacent module in order to cover more distance, if applicable.

Figure 5A:
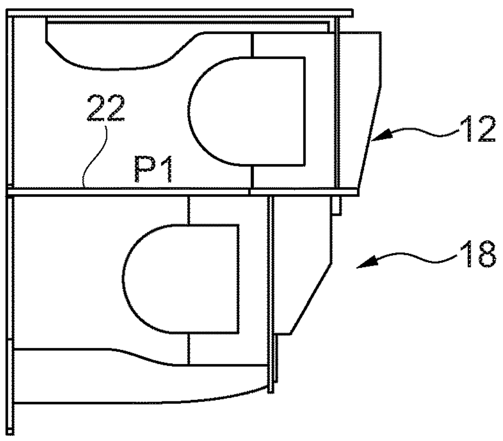
FIG. 5*a* shows a fifth example of a lavatory arrangement with a movable partition wall in a first state.
Figure 5B:
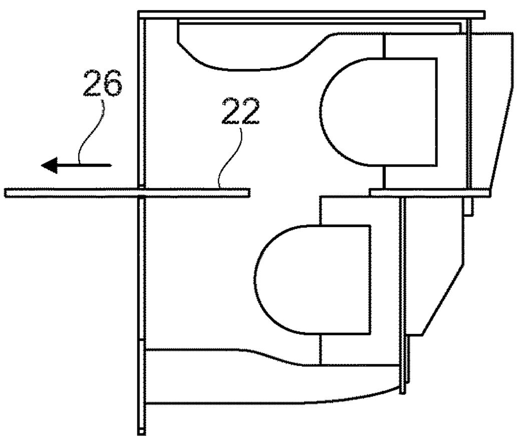
FIG. 5*b* shows the example in a state during movement of the partition wall.
Figure 5C:
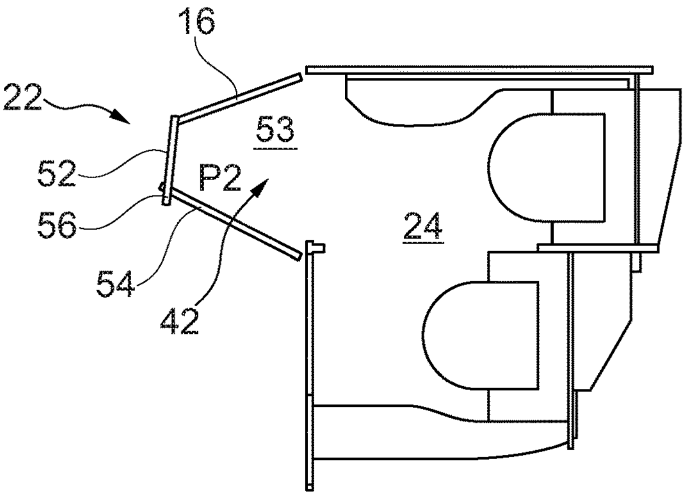
FIG. 5*c* shows the example in a second state providing a still further example of an enlargement to the common lavatory.

FIGS. 5*a*-5*c* show a fifth example of the lavatory arrangement 10 with the movable partition wall 22 in a first state. The partition wall 22 comprises at least two wall panel segments 52, 54 connected by a vertical hinge connection 56. In the secondary position P2, the partition wall 22 is extracted from the arrangement and folded along the vertical hinge connection 56 and attached with its distal end such that an enclosed supplemental space partition 53 is provided in front of the first door 16 or the second door 20, which supplemental space partition 53, also referred to as section, is provided as an added space-portion to the lavatory, i.e., the common lavatory 24 is provided with an additional extension. The supplemental space partition 53 can also be referred to as apsis-like enlargement to the common lavatory 24.

In the secondary position P2, the partition wall 22 is arranged such that the additional space 42 is provided in front of the first or second door separated from an adjacent aisle or seating space, which additional space 42 is provided as an enlargement to the common lavatory 24.

FIG. 5*a* shows the partition wall 22 in the primary position P1.

FIG. 5*b* shows the example of FIG. 5*a* in a state during movement of the partition wall 22. The movement, e.g., a translational movement followed by further movement, like pivoting, is indicated by the arrow 26.

FIG. 5*c* shows the example of FIG. 5*a* in the secondary position P2.

In an example, shown in FIG. 5*c*, also one of the two doors, in this case the first door 16, is used in combination with the wall panel segments 52, 54 to form the apsis-like enlargement.

Figure 6A:
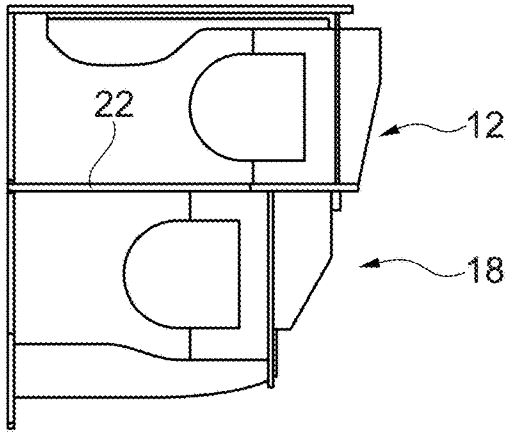
FIG. 6*a* shows a sixth example of a lavatory arrangement with a movable partition wall in a first state.
Figure 6B:
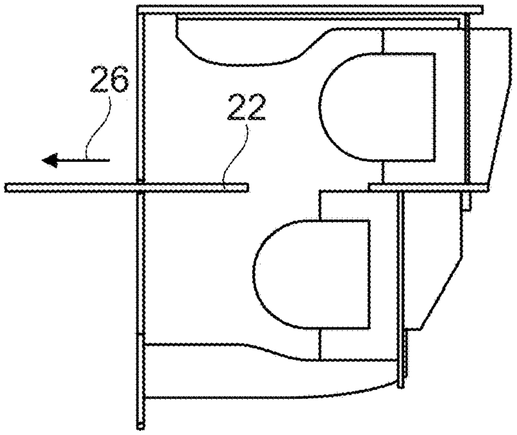
FIG. 6*b* shows the example in a state during movement of the partition wall.
Figure 6C:
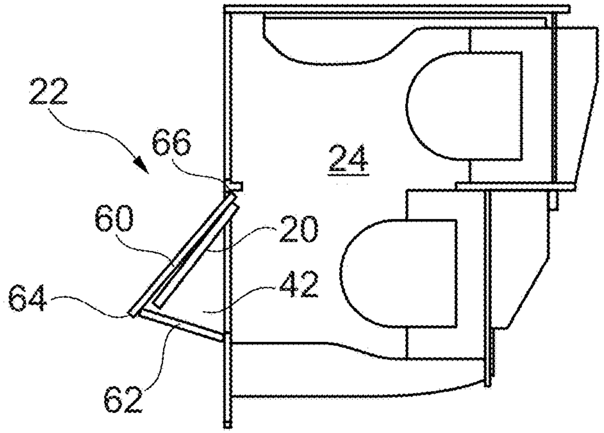
FIG. 6*c* shows the example in a second state providing still another example of an enlargement to the common lavatory.

In another example, not shown in FIG. 5*c*, the door is not used in combination with the wall panel segments 52, 54 to form the apsis-like enlargement, but the door is opened into the apsis-like enlargement (see FIG. 6*c*). The partition wall may have two or three segments or more segments to form an extension space.

The term "wall panel segments" relates to parts of the wall forming the partition wall.

The term "vertical hinge connection" relates to a connection allowing a movement around a vertical axis.

For transforming from the first position into the second position, the partition wall is pulled out of the lavatory arrangement into the aisle space in front of the first and second door. The partition wall is either pulled out completely and then folded, or gradually folded, once the first segment has been pulled out.

In the primary position, the two wall panel segments of the partition wall are arranged in a straightened-out manner forming a straight wall panel. In the secondary position, the two wall panel segments of the partition wall are arranged in an inclined or folded manner forming an angled or folded wall panel.

The door can open into the apsis-like enlargement to be arranged parallel to one of the wall panel segments.

FIGS. 6*a*-6*c* show a sixth example of the lavatory arrangement 10 with the movable partition wall 22. In an example, in the second position P2, the partition wall 22 is arranged in front of and adjacent to one of the first and the second door that is hinged on its vertical lateral edge closer to the other one of the first and the second door, i.e., the door leaf is pivotably mounted by hinges on its lateral side facing the other door. The partition wall comprises two wall panel segments 60, 62, e.g., connected via a vertical hinge 64, and mounted to the lavatory structure by vertical hinge 66. When in the second position, the proximal wall segment has a horizontal width spanning at least the width of the door 20 in front of which it is arranged. The distal wall segment can have a smaller or larger width. The proximal wall segment is arranged with the proximal lateral vertical edge to the lavatory arrangement and movably held by the lavatory arrangement. The distal wall segment is connected with its proximal lateral vertical edge to the distal lateral vertical edge of the proximal wall segment. The distal wall segment is fixed to the lavatory arrangement with its distal lateral vertical edge.

In the secondary position P2, the partition wall 22 is arranged such that the additional space 42 is provided in front of the first or second door separated from an adjacent aisle or seating space, which additional space 42 is provided as an enlargement to the common lavatory 24.

FIG. 6*a* shows the partition wall 22 in the primary position P1.

FIG. 6*b* shows the example of FIG. 6*a* in a state during movement of the partition wall 22. The movement, e.g., a translational movement followed by further movement, like pivoting, is indicated by the arrow 26.

FIG. 6*c* shows the example of FIG. 6*a* in the secondary position P2.

In another example, the partition wall comprises three wall panel segments, a proximal wall segment, a distal wall segment and a middle wall segment arranged between the proximal wall segment and the distal wall segment.

In an option, in the completely pulled out state, the partition wall maintains connected to the lavatory arrangement with its proximal end.

In an example, the partition wall slides out of the lavatory, folds and locks into lavatory door frame, in order to create additional space for assist person during PRM transfer.

In another example, the partition wall slides out of the lavatory, folds and locks into aircraft lining, in order to create additional space for assist person during PRM transfer.

Figure 7A:
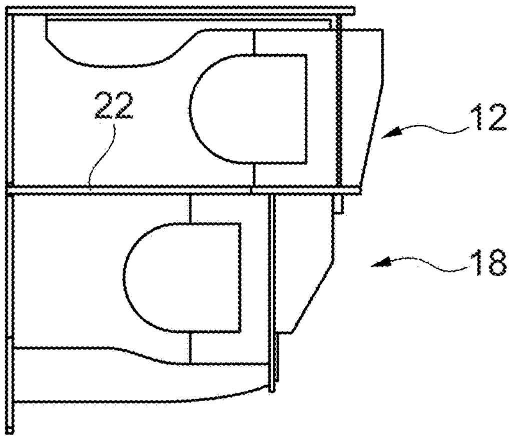
FIG. 7*a* shows a seventh example of a lavatory arrangement with a movable partition wall in a first state.
Figure 7B:
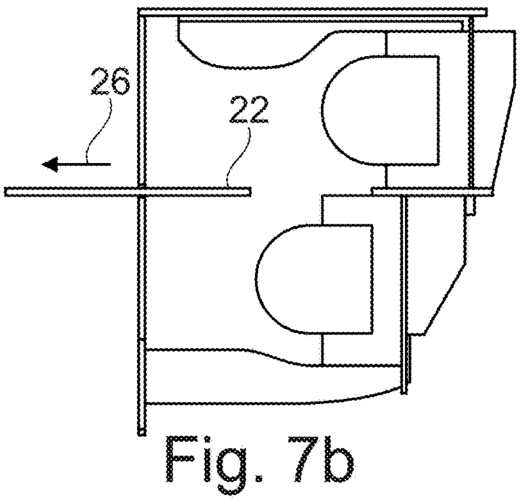
FIG. 7*b* shows the example in a state during movement of the partition wall.
Figure 7C:
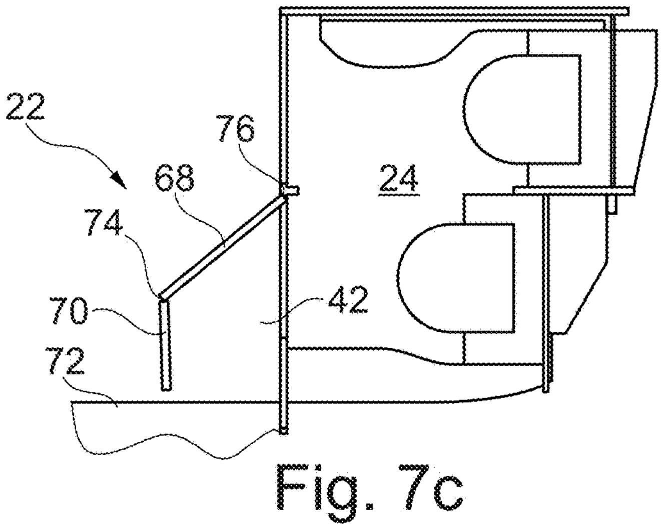
FIG. 7*c* shows the example in a second state providing a furthermore example of an enlargement to the common lavatory.

FIGS. 7*a*-7*c* show a seventh example of the lavatory arrangement 10 with the movable partition wall 22 in a first state. The partition wall 22 comprises at least two wall panel segments 68, 70 connected by a vertical hinge connection 74. In the secondary position P2, the partition wall 22 is extracted from the arrangement and folded along the vertical hinge connection and attached with its distal end to a cabin wall structure 72 or aircraft door arranged to the side of the first or the second lavatory such that a supplemental space section adjacent to the first or second door is provided, which supplemental space section is provided as an enlargement to the common lavatory 24.

In an example, instead of the cabin wall structure 72 or the aircraft door, a monument is provided and the partition wall 22 folds against the monument, which can be a partition wall, a galley, a lavatory or a stowage space.

In the secondary position P2, the partition wall 22 is arranged such that the additional space 42 is provided in front of the first or second door separated from an adjacent aisle or seating space, which additional space 42 is provided as an enlargement to the common lavatory 24.

The door 20 can open into the additional space 42.

FIG. 7*a* shows the partition wall 22 in the primary position P1.

FIG. 7*b* shows the example of FIG. 7*a* in a state during movement of the partition wall 22. The movement, e.g., a translational movement followed by further movement, like pivoting, is indicated by the arrow 26.

FIG. 7*c* shows the example of FIG. 7*a* in the secondary position P2.

The door can open into the enlargement to the common lavatory to be arranged parallel to one of the wall panel segments.

In an option, in the completely pulled out state, the partition wall maintains connected to the lavatory arrangement with its proximal end.

In an example, the opened partition wall is slid, folded and locked into lavatory door frame. The partition wall slides out of the lavatory, folds and locks into lavatory door frame, in order to create additional space for assist person during PRM transfer.

Figure 8A:
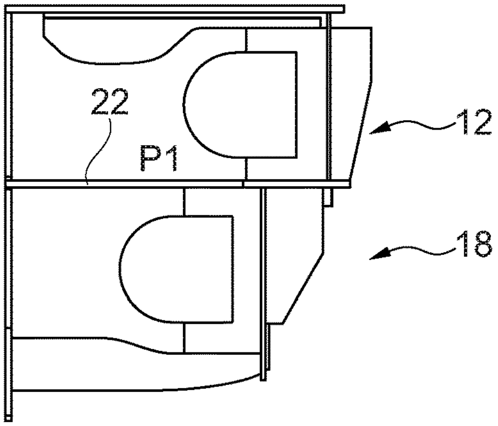
FIG. 8*a* shows an eighth example of a lavatory arrangement with a movable partition wall in a first state.
Figure 8B:
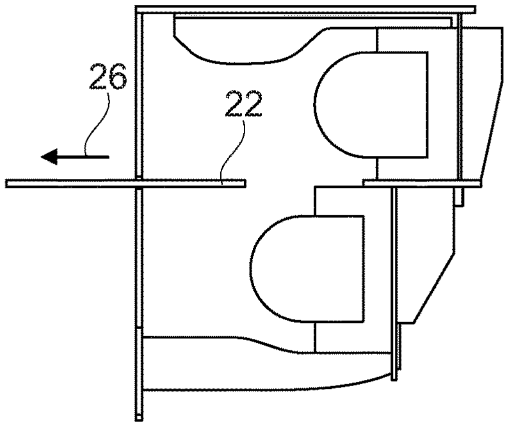
FIG. 8*b* shows the example in a state during movement of the partition wall.
Figure 8C:
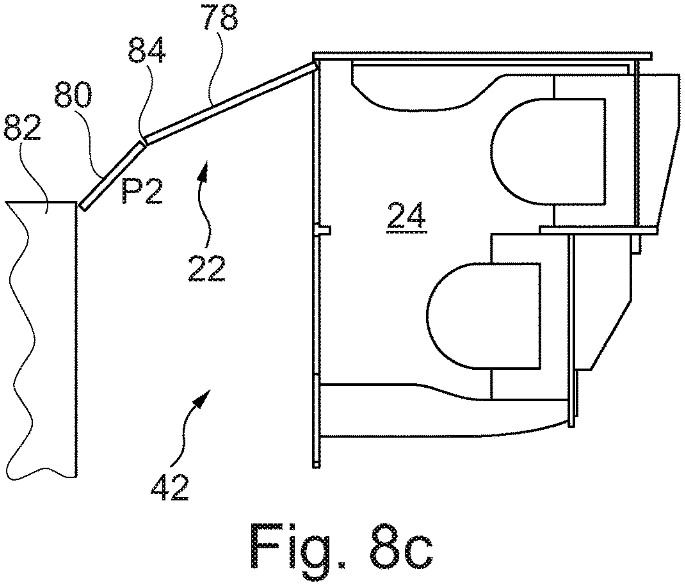
FIG. 8*c* shows the example in a second state providing an even further furthermore example of an enlargement to the common lavatory.

FIGS. 8*a*-8*c* show an eighth example of the lavatory arrangement 10 with the movable partition wall 22 in a first state. In the secondary position P2, the partition wall 22 is arranged extending from the lavatory arrangement 10 to a monument 82 provided on an opposite side of the aisle area. For achieving the secondary position P2, in the completely pulled out state the partition wall 22 is movable with its proximal edge from a location between the first and the second door 16, 20 towards a location on the opposite side of the first and the second door. In the secondary position P2, the partition wall 22 is connected with its proximal end to a portion of the lavatory arrangement 10 that is arranged on a lateral side of the first or the second door such that an enlarged additional space is provided in front of the first and second door 16, 20 separated from an adjacent aisle or seating space, which additional space is provided as an enlargement to the common lavatory 24. The partition wall 22 has a first panel 78 and a second panel 80 bridging to a monument 82, for example, an edge or side of the monument 82. The two panels are connected via a hinge 84.

In the secondary position P2, the partition wall 22 is arranged such that the additional space 42 is provided in front of the first or second door separated from an adjacent aisle or seating space, which additional space 42 is provided as an enlargement to the common lavatory 24.

The monument 43 can be a partition wall, a galley, a lavatory or a stowage space.

FIG. 8*a* shows the partition wall 22 in the primary position P1.

FIG. 8*b* shows the example of FIG. 8*a* in a state during movement of the partition wall 22. The movement, e.g., a translational movement followed by further movement, like pivoting, is indicated by the arrow 26.

FIG. 8*c* shows the example of FIG. 8*a* in the secondary position P2.

The lateral side of the first or the second door relates to a location that is on a side of the door that is opposite to a location between the two doors.

In an option, in the completely pulled out state, the partition wall maintains connected to the lavatory arrangement with its proximal end to a portion of the lavatory arrangement that is arranged between the first and the second door.

Instead of stowing the partition wall inside the lavatory monument, in this variation the slid out partition wall is removed and fixed in a manner that it creates additional space for the PRM assist person.

In an example, the partition wall slides out of the lavatory, folds and locks into A/C lining, in order to create additional space for assist person during PRM transfer.

In an option, not shown, the partition wall 22 comprises extendable closure segments on its upper edge; the closure segments can be extracted in the secondary position to enclose the additional separated space towards above.

The additional separated space can be provided as rigid flaps bridging the gap between the partition wall and the lavatory compartment housing structure or soft fabric-type cover segments spanning from partition wall and the lavatory compartment housing structure.

Figure 9A:
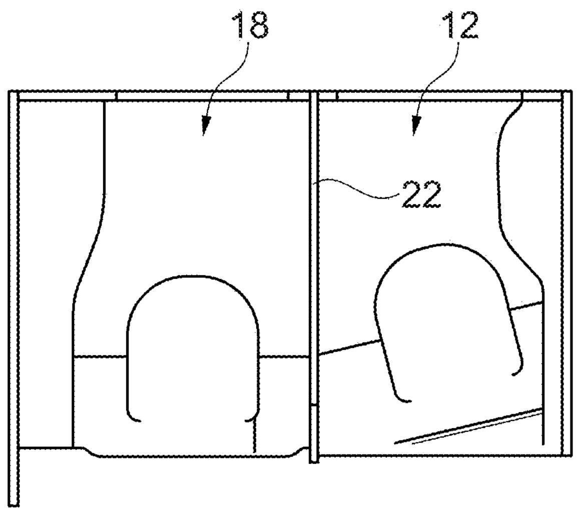
FIG. 9*a* shows a ninth example of a lavatory arrangement with a movable partition wall in a first state.

FIG. 9*a* shows a ninth example of a lavatory arrangement with the movable partition wall 22 in a first state, i.e., in the primary position P1.

Figure 9B:
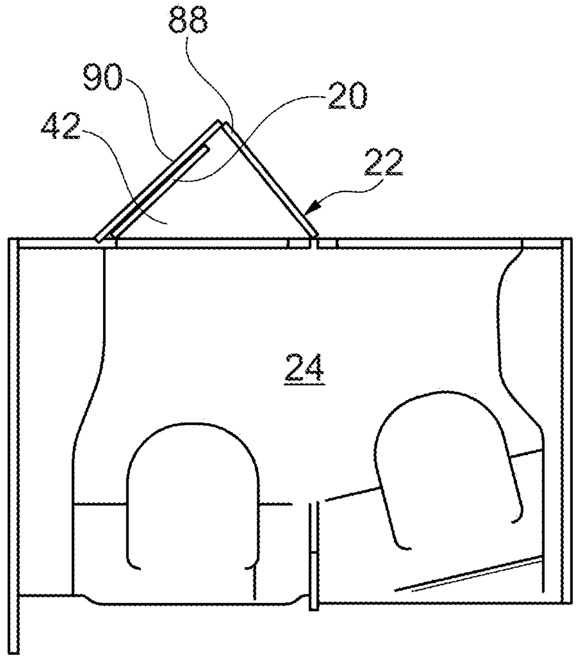
FIG. 9*b* shows the example in a second state providing an example of an enlargement to the common lavatory similar to the example of FIGS. 6*a/b*.

FIG. 9*b* shows the example in a second state providing an example of an enlargement to the common lavatory similar to the example of FIGS. 6*a/b* with the movable partition wall 22 in the secondary position P2. The movable partition wall 22 comprises two panels 88, 90, connected via a hinge. The door leaf of the door 20 can open into the space provided by the movable partition wall 22.

In the secondary position P2, the partition wall 22 is arranged such that the additional space 42 is provided in front of the first or second door separated from an adjacent aisle or seating space, which additional space 42 is provided as an enlargement to the common lavatory 24.

Figure 10:
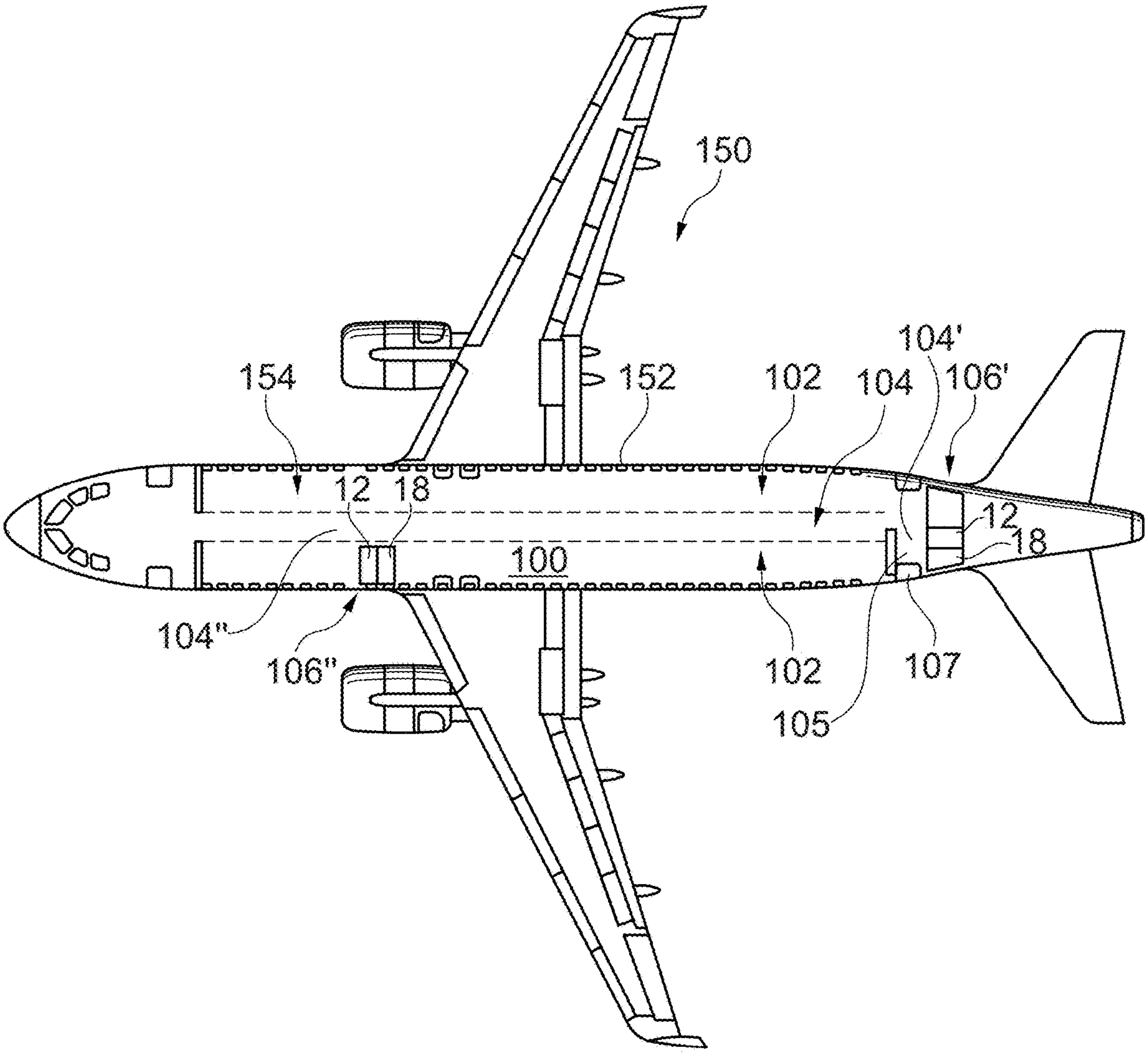
FIG. 10 shows an example of a cabin in an aircraft.

FIG. 10 shows an example of a cabin 100 in an aircraft. The cabin 100 comprises at least one passenger seating zone 102 with a plurality of passenger seats. The cabin 100 also comprises at least one aisle zone 104 for allowing movement of the passengers inside the cabin. The cabin 100 further comprises at least one lavatory monument.

The lavatory monument relates to a monument providing sanitary service functions. The lavatory monument accommodates one or several lavatory compartments. In the present example, at least two lavatory compartments are provided. The lavatory monument can also be referred to as lavatory module lavatory unit or lavatory.

In an option, an entry zone 105 is provided to be arranged next to an aircraft door 107, the entry zone comprising an entry aisle area 104'. The first and second lavatory compartments 12, 18 are accessible from the entry aisle area. As an example, a first lavatory monument 106' is provided in the rear end, e.g., near the bulkhead.

In an option, the at least one aisle zone 104 comprises at least one longitudinally arranged aisle 104'. The first and second lavatory compartments 12, 18 are accessible from the aisle 104'. As another example, a second lavatory monument 106" is provided along the aisle. The at least one lavatory monument 106',106" comprises at least one example of the lavatory arrangement 10 according to one of the examples above.

The term "passenger seating zone" relates to the parts of the cabin in which seats are provided for passengers.

The term "aisle zone" relates to the parts of the cabin that act as corridors for movement onboard the aircraft.

The term "lavatory monument" relates to monuments and other arrangements in the cabin providing the restroom functions onboard the aircraft.

FIG. 10 also shows an example of an aircraft 150 comprising a fuselage 152 and a cabin space 154 arranged within the fuselage 152. Within the cabin space, in a first option, it is provided at least one lavatory arrangement according to one of the examples above. Within the cabin space, in a second option, in addition or alternatively, it is provided a cabin according to one of the examples above.

Figure 11A:
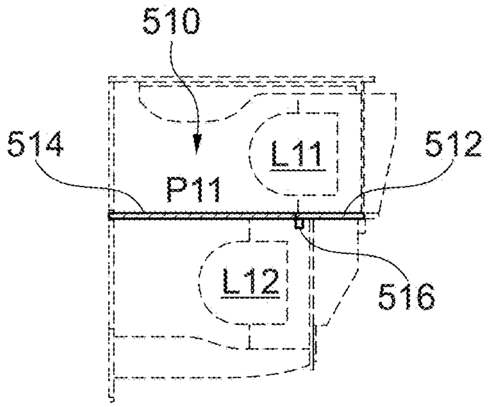
FIG. 11*a* schematically shows a horizontal section of an example of a divider wall for an aircraft lavatory arrangement in a cabin of an aircraft. For better understanding, the lavatory arrangement is also indicated. A secondary wall panel of the divider wall is arranged in a first position providing a separation between two adjacent lavatories.

Aspect II: FIGS. 11*a*/11*b* schematically show an example of a divider wall 510 for an aircraft lavatory arrangement in a cabin of an aircraft. The divider wall 510 comprises a primary wall panel 512, a secondary wall panel 514 and a fitting assembly 516. The primary wall 512 panel is configured to be fixedly arranged between a first lavatory L11 and a second lavatory L12 of a double lavatory arrangement. The secondary wall panel 514 is configured to be removably arranged between the first and the second lavatory L11, L12 such that in an attached first position P11, the secondary wall panel 514 and the primary wall panel 512 provide a separation between the first and the second lavatory L11, L12. The secondary wall panel 514 is movable to a detached second position P12 outside the lavatory arrangement in which second position P12 a separation of the first and the second lavatory L11, L12 is cancelled. The fitting assembly 516 is configured to removably mount the secondary wall panel 514 in the first position P11 to at least one of the group comprising: a lavatory enclosure and the primary wall panel 512.

FIGS. 11*a*/11*b* shows a horizontal section of the divider wall 510. For better understanding, the lavatory arrangement with the first and the second lavatory L11, L12 is also indicated.

FIG. 11*a* shows the secondary wall panel 514 in the attached first position P11.

Figure 11B:
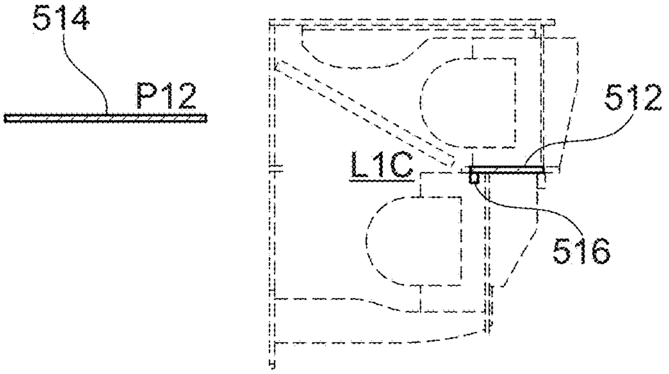
FIG. 11*b* shows the example of FIG. 11*a* with the secondary wall panel of the divider wall arranged in a detached second position outside the lavatory arrangement; a separation of the adjacent lavatories is cancelled.

FIG. 11*b* shows the secondary wall panel 514 in the detached second position P12 outside the lavatory arrangement; a separation of the adjacent lavatories is cancelled, and an enlarged common lavatory LC is provided. In addition, also an interim position during the free movement of the secondary wall panel 514 from the first position P11 to the second position P12 is shown in broken lines.

The term "primary wall panel" relates to a part of the divider wall 510 that is configured to remain. The primary wall panel 512 can also be referred to as main wall part, fixed wall panel or fixed wall portion.

The term "secondary wall panel" relates to a part of the divider wall 510 that is configured to be removed temporally. The secondary wall panel 514 can also be referred to as movable wall part, movable wall panel or movable wall portion.

The term "fitting assembly" relates to the hardware and connection interfaces arranged for the mounting and releasing of the secondary wall panel. The fitting assembly 516 can also be referred to as detachable fitting assembly. The fitting assembly 516 comprises latches, bolts, screws or other detachable or releasable mounts to hold the secondary wall panel 514 in the first position P11.

The divider wall 510 can also be referred to as partition wall or separating wall. The divider wall 510 can also be referred to as movable bi-functional divider wall.

The secondary wall panel 514 provides a detachable divider wall for lavatory monuments.

Figure 16A:
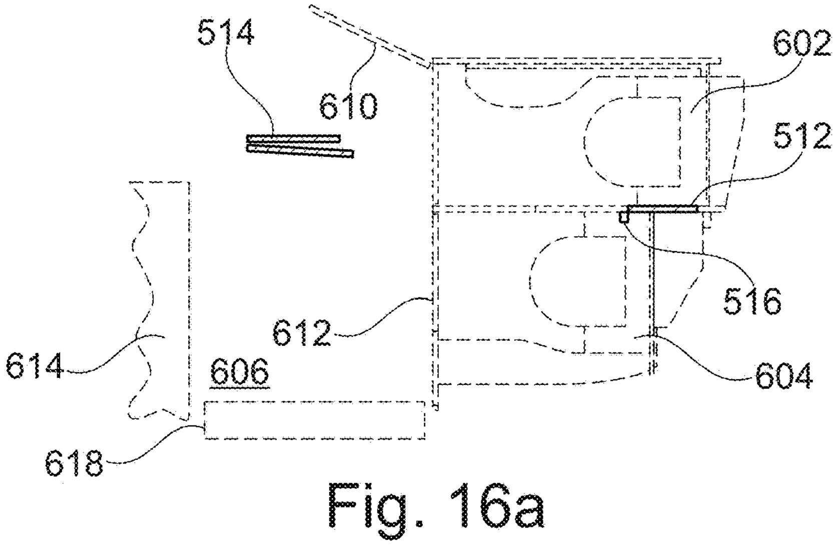
FIG. 16*a* shows a further example of the lavatory arrangement in which the secondary wall panel is arranged outside the lavatory compartment in an aisle region in front of the lavatories.
Figure 16B:
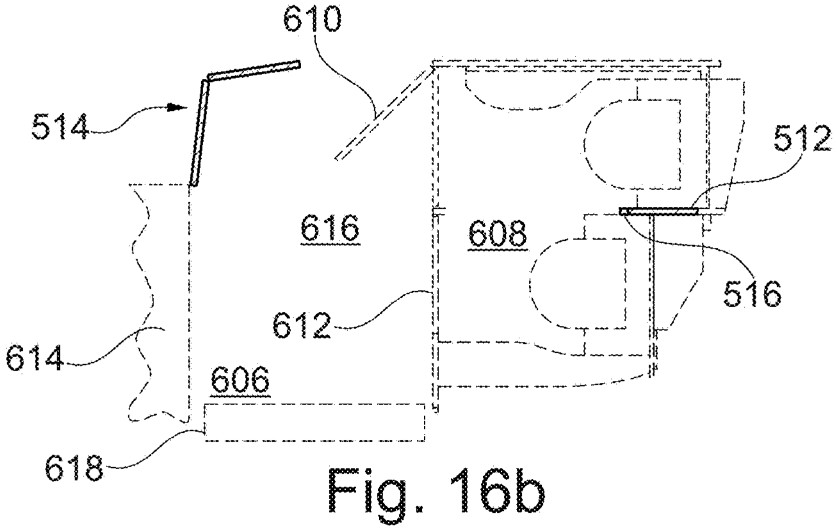
FIG. 16*b* shows the secondary wall panel of FIG. 16*a* being temporarily attached to a monument or other fixed structure across the aisle area.
Figure 16C:
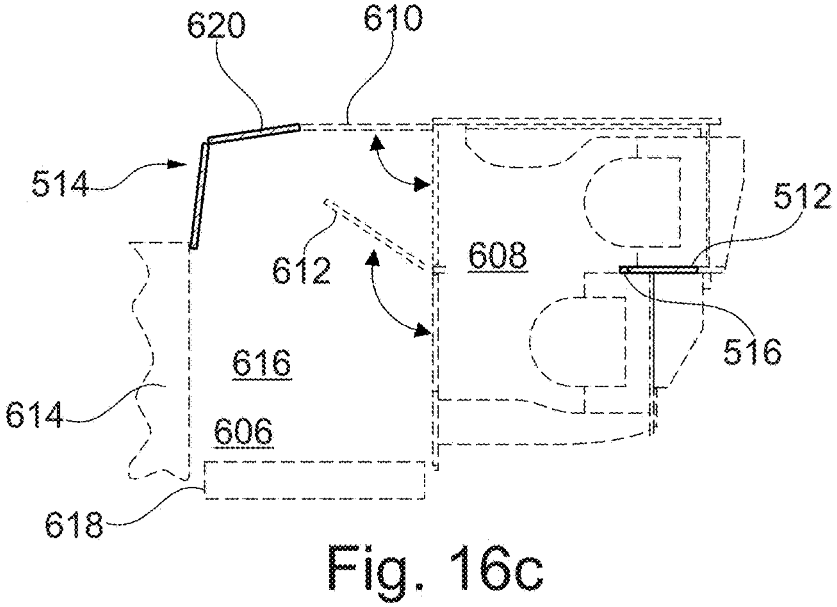
FIG. 16*c* shows the secondary wall panel of FIG. 16*a* being also temporarily attached to the monument or other fixed structure, while a lavatory door is opened and connected to the secondary wall segment with its free door leaf end. A vestibule is enclosed providing additional space for the user of the lavatory, e.g., a PRM passenger.

In an option of the example of FIG. 11, the fitting assembly 516 is configured to removably fix the secondary wall panel 514 in the second position P12 to at least one of the group comprising: a cabin facing side of the lavatory enclosure and another monument within the cabin (see also FIG. 16*a-c*).

The secondary wall panel 514 thus partly encloses or at least separates an additional space in front of the lavatory for the use of a PRM when using the lavatory.

Further, in an example, the fitting assembly 516 is configured to removably connect the secondary wall panel 514 on one end to the cabin facing side of the lavatory enclosure or to another monument within the cabin across the aisle area in front of the lavatory. In a sill further, the fitting assembly 516 is configured to removably connect the secondary wall panel 514 on its other end to the other side, i.e., to the monument or to the cabin facing side of the lavatory enclosure.

The connection of the secondary wall panel 514 with the lavatory enclosure can be either directly to the outside of the lavatory enclosure, or indirectly via a bridging part, such as an opened lavatory door.

In an option, the secondary wall panel 514 is symmetric along a vertical axis. The term "symmetric" relates to having similar lateral connection and mounting interfaces. In an option, the term "symmetric" relates to similar connection interfaces for mounting in the first position. This allows one to mount the secondary wall panel 514 in either orientation and facilitates handling when transforming the lavatory from the second scenario, e.g., the enlarged common lavatory, with or without separate space provided in front of the door opening, to the first scenario, e.g., the dual lavatory use. In another option, the term "symmetric" also refers to similar connection interfaces for mounting in the second position.

Figure 12A:
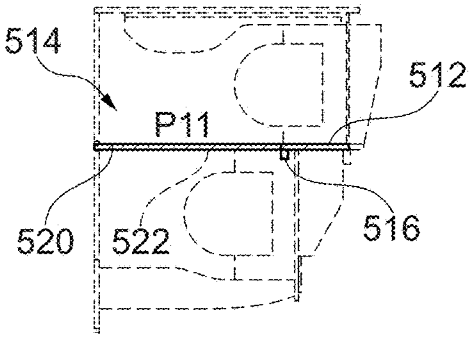
FIG. 12*a* shows a further example of the divider wall in the first position. The secondary wall panel comprises two panel segments.

FIG. 12*a* shows a further example of the divider wall 510 in the first position P11. As an option, the secondary wall panel 514 comprises a first panel segment 520 and a second panel segment 522. The first panel segment 520 and the second panel segment 522 are movably connected to each other.

Figure 12B:
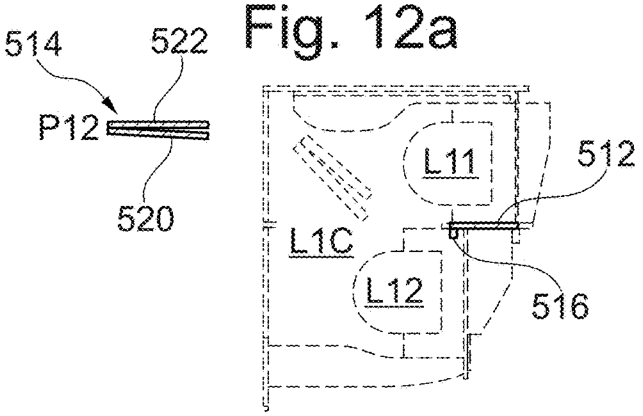
FIG. 12*b* shows the example of FIG. 12*a* in the second position.

FIG. 12*b* shows the example of FIG. 12*a* with the first panel segment 520 and the second panel segment 522 of the secondary wall panel 514 in the second position P12. In addition, also an interim position during the free movement of the secondary wall panel 514 from the first position P11 to the second position P12 is shown in broken lines.

The term "panel segments" relates to parts of the secondary wall panel 514 forming the removable part of the divider wall 510. In an option, more than two, i.e., three, four, five or more panel segments are provided.

In an example, the secondary wall panel 514 comprises three or more panel segments, e.g., pivotably attached to each other.

In a first option, the first panel segment 520 and the second panel segment 522 are permanently attached to each other when the secondary wall panel 514 is brought from the first position P11 to the second position P12 and vice versa.

In an example, the first panel segment 520 and the second panel segment 522 are connected in a foldable manner, e.g., by a vertical hinge connection.

The term "vertical hinge connection" relates to a connection allowing a movement around a vertical axis when the secondary wall panel 514 is arranged vertically, like when in the first position P11.

In a second option, the first panel segment 520 and the second panel segment 522 are removably attached to each other such then when the secondary wall panel 514 is brought from the first position P11 to the second position P12, and vice versa, the two or more panel segments are handled separately.

In an example, the first panel segment 520 and the second panel segment 522 are releasably connected along a vertical axis.

According to an example, the first panel segment 520 and the second panel segment 522 are symmetric along a vertical axis of the vertical hinge.

The term "symmetric" relates to having similar dimensions to fold onto each other. In an option, the term "symmetric" relates to similar connection interfaces for mounting in the first position. In another option, the term "symmetric" also refers to similar connection interfaces for mounting in the second position.

The term "vertical axis" relates to a virtual line that may coincide with the pivot/rotation axis.

Figure 13:
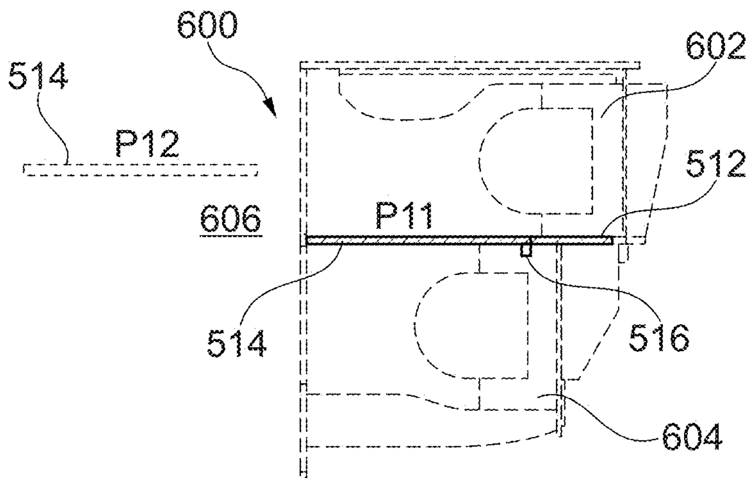
FIG. 13 shows a horizontal section or plan view of an example of a lavatory arrangement with the divider wall of FIGS. 11*a* and 11*b*.
Figure 14:
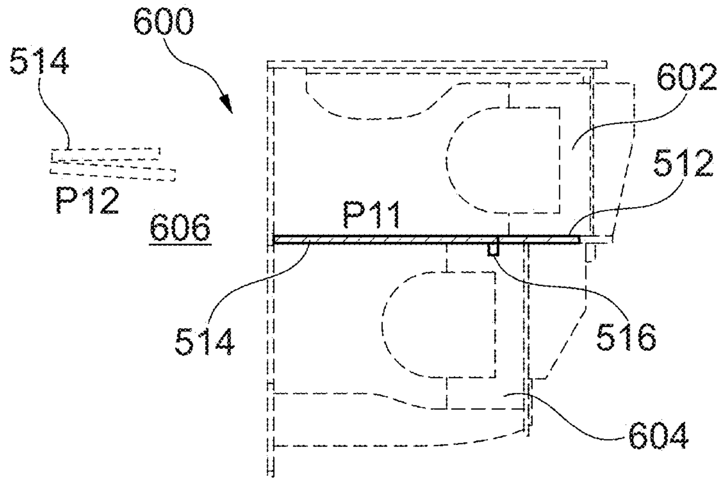
FIG. 14 shows an example of the lavatory arrangement with the divider wall of FIGS. 12*a* and 12*b*.

FIG. 13 and FIG. 14 show a horizontal section or plan view of an example of a lavatory arrangement 600 for an aircraft cabin. The arrangement 600 comprises a first lavatory compartment 602 and a second lavatory compartment 604. The first lavatory compartment 602 is accessible from an aisle area 606. The second lavatory compartment 604 is also accessible from the aisle area 606. An example of the divider wall 510 according to one of the examples above is arranged between the first lavatory compartment 602 and the second lavatory compartment 604. In the first position P11, the divider wall 510 separates the first lavatory compartment 602 from the second lavatory compartment 604. In the second position P12, the secondary wall panel is brought outside the first lavatory compartment 602 and outside the second lavatory compartment 604. In the second position P12, the first lavatory compartment 602 and the second lavatory compartment 604 provide an enlarged common lavatory 608.

As an example, both lavatories are provided with a toilet and a washbasin. However, also other configurations of the lavatory interiors are provided.

In the example of FIG. 13, the secondary wall panel 514 is provided as a single panel segment. The second position P12 of the secondary wall panel 514 outside the lavatory is shown in broken lines.

In the example of FIG. 14, the secondary wall panel 514 is provided as a dual-panel segments. The second position P12 of the secondary wall panel 514 outside the lavatory is also shown in broken lines.

The lavatory arrangement 600 serves as a bi-functional lavatory. In a first scenario, the lavatory arrangement 600 is providing a dual lavatory for individual use by two passengers. In a second scenario, the lavatory arrangement 600 provides a single lavatory for use by only one passenger, e.g., by a passenger/person with reduced mobility.

In an option, the two lavatory compartments are provided such that the toilets are displaced in relation to each other in their distance to the entry side.

In an example, the at least one aisle zone 606 comprises at least one longitudinally arranged aisle. The first and second lavatory compartments are accessible from the aisle.

In an example, an entry zone is provided to be arranged next to an aircraft door (see also FIGS. 16*a-c*); the entry zone comprises an entry aisle area. The first and second lavatory compartments are accessible from the entry aisle area.

As an example, the enlarged common lavatory is provided for the use by passengers with reduced mobility.

The term "lavatory compartment" relates to an enclosed space having installations of a lavatory such as a toilet, a urinal, a sink, a mirror or a waste bin. The lavatory compartment can also be referred to as lavatory, toilet room, restroom or passenger service room. The lavatory compartment can also be referred to as toilet space.

The term "aisle area" relates to parts of the cabin provided for access by passengers and crew, movement onboard of passengers and crew, movement of service units like trolleys for onboard service. The aisle area is usually adjacent to seating areas having passenger seats. The aisle area can also be referred to as corridor arrangement.

The term "partition wall" relates to a wall separating the spaces of the first lavatory compartment and the second lavatory compartment, i.e., of the first and second toilet spaces. The partition wall acts as separating structure in the first use and, when being removed, "acts" as integrator or connector for combining both smaller lavatory spaces to the enlarged common space. The partition wall is thus a bi-functional lavatory wall. The term "bi-functional" relates to the wall being able to move between two positions fulfilling two different purposes.

The term "first position" relates to a primary or main position for the use of the lavatories. The first position P11 can also be referred to as a dual toilet use position.

The term "second position" relates to a secondary or auxiliary position for the use of the lavatories. The second position P12 can also be referred to as a PRM-toilet use position.

The term "common lavatory" relates to the enlarged toilet space in which both toilets are enclosed, but only one is actually usable.

The term "outside the lavatory arrangement" relates to the secondary wall panel is being moved out of the interior and in front of the housing of the lavatory arrangement.

In the second position P12, the bi-functional partition wall is brought into a position outside the lavatory arrangement 600.

The enlarged common lavatory is configured for the use of the lavatory by passengers with reduced mobility (PRM), e.g., passengers that are using a wheelchair. For the use of a lavatory by a PRM, a transfer from the wheelchair onto a toilet seat and from there back to the wheelchair must be possible. Besides additional handles and grip portions throughout the cabin, also more space must be provided for this use scenario. For the further use of a lavatory by a PRM, also space for a support person may be needed.

In order to save space, the lavatory compartments are configured for standard use, allowing minimal space occupying layouts. However, these are too small for use by PRMs. For providing larger lavatory compartments that are suitable for being used by PRMs, two lavatory compartments are combined by removing the partition wall. Instead of folding and storing the wall segment(s) inside the lavatory, the wall is moved out of the lavatory compartment and fixed in a different position. Thus, the space available inside the lavatory compartment is maximized.

The enlarged common lavatory allows the use of a wheelchair. Further, also space for a support person is provided by the enlarged common lavatory.

In an option, at least one of the first and second lavatory compartments comprises a toilet.

In one example, the first lavatory compartment comprises a toilet; the second lavatory compartment may comprise another facility like a sink, a urinal, a table or the like.

In another example, the first lavatory compartment comprises a toilet and the second lavatory compartment also comprises a toilet.

In addition, the first or the second lavatory compartment or both the first lavatory compartment and the second lavatory compartment comprise a sink in addition. In an option, a urinal can be provided in addition to a toilet, in one or both of the first and second lavatory compartment.

Figure 15:
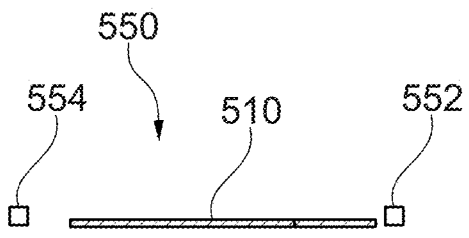
FIG. 15 schematically shows an example of a kit for converting a lavatory arrangement with two adjacent lavatories into a PRM-suitable enlarged lavatory.

FIG. 15 schematically shows an example of a kit 550 for converting a lavatory arrangement with two adjacent lavatories into a PRM-suitable enlarged lavatory. The kit 550 comprises an example of the divider wall 510 according to one of the examples above that is configured to replace an existing rigid divider wall between the two adjacent lavatories. Further, the kit 550 comprises a primary fitting 552 to fixedly install the primary wall panel 512 inside the lavatory arrangement.

The term "primary fitting" relates to arrangement of hardware and connection interfaces that provide the mount of the primary wall panel.

In an option, the kit 550 is provided comprising the secondary wall panel 514, while the primary wall panel is provided by an existing panel segment of the separation wall of the lavatory.

The kit 550 allows one to replace a solid wall and to convert the lavatory such that it can at least temporarily transformed into a bigger lavatory in order to gain space for an assisted PRM transfer from a wheelchair to a toilet seat. The kit 550 can be offered as retrofit upgrade or as modification during a cabin installation.

Thus, the detachable divider wall can be detached completely from the lavatory housing structure and brought outside the lavatory. The moved wall panel acts as a visual barrier outside the lavatory. The visual barrier gains additional private space in front of the lavatory monument.

In an option of the example of FIG. 15, the fitting assembly 516 of the divider wall 510 comprises at least one holding device 554 that is configured to removably mount the secondary wall panel 514 in the second position P12 to a cabin facing side of the lavatory enclosure and/or another monument within the cabin.

The term "holding device" relates to an arrangement of hardware and connection interfaces that provide the movable mount of the secondary wall panel.

The holding device assembly comprises, e.g., latches, bolts, screws or other detachable or releasable mounts to hold the secondary wall panel in the second position. In an example, the holding device is configured to be attached to the secondary wall panel 514. In an example, the holding device is configured to be attached to the cabin facing side of the lavatory enclosure and/or another monument within the cabin. In an example, the holding device is configured to be attached to both the secondary wall panel 514 and the cabin structure in form of the cabin facing side of the lavatory enclosure and/or another monument within the cabin.

FIGS. 16*a*, 16*b* and 16*c* show a further example of the lavatory arrangement 600.

In FIG. 16*a*, the secondary wall panel 514 is arranged outside the lavatory compartment in an aisle region in front of the lavatories. In FIG. 16*b*, the secondary wall panel 514 is temporarily attached to a monument or other fixed structure across the aisle area. In FIG. 16*c*, the secondary wall panel 514 is also temporarily attached to the monument or other fixed structure, while a lavatory door is opened and connected to the secondary wall segment 514 with its free door leaf end. A vestibule is enclosed providing additional space for the user of the lavatory, e.g., a PRM passenger.

In an option, in a completely moved out state, the divider wall is non-connected to the cabin facing side of the lavatory enclosure and/or the monument, before being removably mounted to the cabin facing side of the lavatory enclosure and/or the monument.

According to an example, the first lavatory compartment 602 is accessible from the aisle area via a first door 610, and the second lavatory compartment 604 is accessible from the aisle area via a second door 612. In the second position P12, the secondary wall panel 514 is arranged extending from the lavatory compartment 602 towards a monument 614 provided on an opposite side of the aisle area 606 such that an additional space 616 is provided in front of the first or second door separated from an adjacent aisle or seating space, which additional space is provided as an enlargement to the common lavatory.

The enlargement provides a sort of vestibule for the enlarged lavatory space.

In an example, the fitting assembly 516 is configured to removably fix the secondary wall panel 514 in the second position P12 to at least one of the group comprising: a cabin facing side of the lavatory enclosure and another monument within the cabin such that the additional space 616 is provided in front of the first or second door 610, 612 separated from an adjacent aisle or seating space, which additional space is provided as an enlargement to the common lavatory.

The term "removably fix" refers to mounting the secondary wall panel 514 in a releasable manner to be able to remove the secondary wall panel 514, i.e., to move the secondary wall panel 514 from the second position P12 back to the first position P11.

The term "cabin facing side" relates to an outer side of the lavatory enclosure that is directed to the cabin interior, e.g., an aisle area adjacent to the lavatory arrangement 600. The aisle area, or aisle region, can be an aisle section that runs transverse the flight direction, e.g., an aisle portion connection a main aisle running in the flight direction with an aircraft door. The aisle area, or aisle region, can also be an aisle section that runs along the flight direction.

The term "another monument" relates to another structure arranged within the cabin. The other monument can be a further lavatory, a galley structure, a storage space, a partition wall or a wall behind a seat row or the like.

The term "door" refers to a movable part that allows entry to a lavatory compartment.

As an example, the aisle area 606 is arranged next to an aircraft door 618. The aisle area 606 is thus also used as an entry/exit area. However, during flight, the aisle area 606 can be used for different purposes.

As an example, the secondary wall panel 514 is connectable to the cabin facing side of the lavatory enclosure and another monument within the cabin by at least one holding device of the fitting assembly 516 of the divider wall 510. The holding device is configured to removably mount the secondary wall panel 514 in the second position P12 to the cabin facing side of the lavatory enclosure and the another monument within the cabin.

The secondary wall panel 514 is at least partly enclosing a part of the aisle area 606 in front of the lavatory arrangement 600 providing the additional separated space as the enlargement to the common lavatory.

As an example, the additional separated space is provided as an enlargement to the common lavatory for the use by passengers with reduced mobility.

The term "enlargement" relates to an added space portion increasing the available space.

The separated space is provided as a private space.

For transforming from the first position P11 into the second position P12, the divider wall 510 is partly taken out of the lavatory arrangement 600 to the aisle space in front of the first and second door. The movable part of the divider wall 510 is either taken out completely and then folded, or gradually folded and then taken out, and then at least partly unfolded.

In the first position P11, the two wall panels of the divider wall 510 are arranged in a straightened-out manner forming a straight wall panel. In the second position P12, the two wall panels of the divider wall 510 are arranged in an inclined or folded manner forming an angled or folded panel.

In the second position P12, the divider wall 510 is arranged extending from the lavatory arrangement 600 to a monument provided on an opposite side of the aisle area. For achieving the second position P12, in the completely removed state, the secondary wall panel 514 is movable with to a location outside the lavatory. In the second position P12, the secondary wall panel 514 is connected with one lateral vertical side edge to the monument across the aisle area and with the other one lateral vertical side edge to a portion of the lavatory arrangement 600 that is arranged on a lateral side of the first or the second door such that an enlarged additional space is provided in front of the first and second door separated from an adjacent aisle or seating space, which additional space is provided as an enlargement to the common lavatory.

The lateral side of the first or the second door relates to a location that is on a side of the door that is opposite to a location between the two doors.

Instead of stowing the movably wall panel of the divider wall inside the lavatory monument, the taken out wall panel is removed and fixed in a manner that it creates additional space for the PRM assist person in front of the lavatory, in addition to providing a common, enlarged lavatory space.

The monument can be a partition wall, a galley, a lavatory or a stowage space.

In an option, the secondary wall panel 514 is temporarily locked to the monument provided on the opposite side.

The term "aisle area" relates to space in the cabin used for passenger and crew movement in the cabin. The aisle area relates to the main aisles commonly arranged in longitudinal direction of an aircraft, for example one or two or more aisles separating the two or more seating zones. The aisle area also relates to the aisle sections in transverse direction, connecting different main aisles or providing access to the aircraft doors, to galley sections and lavatories, the cockpit door, and also internal staircases on board the aircraft.

In an example, the lavatory door opens to the outside, i.e., towards the aisle area.

As an option, the lavatory door opens such that in view of a possible emergency situation, the door does not open against a stream of evacuating passengers such that these would run into the obstructing door. Rather, the door opens in direction of stream of passengers such that these would re-close the lavatory door.

In another example, the lavatory door is a folding door that folds within the door opening.

In a further example, the lavatory door opens to the inside, i.e., towards the lavatory compartment.

As an option, FIG. 16*c* shows that, in the second position P12, the secondary wall panel 514 is attached to an opened distal edge 620 of the first or the second door.

The term "distal edge" relates to an edge of the door opposite to an edge connected via hinges to a door frame. The distal edge is the free end or edge of the door when the door is opened.

In an option, the secondary wall panel 514 is attached to an opened distal edge of the lavatory door that is further away from outer fuselage structure. The door that is further away from outer fuselage structure can be referred to as first lavatory door. The lavatory door closer to the outer fuselage structure can be referred to as second lavatory door. The second lavatory door can be opened such that the second door closes the door opening of the first door.

The door can be hinged to an outer lateral corner section of the lavatory.

In an option, the door is hinged to a central section of the lavatory, between the two openings for the two lavatory doors.

As an option, an additional curtain segment is provided to close an area above the opened door and above the secondary wall panel 514.

Figure 17:
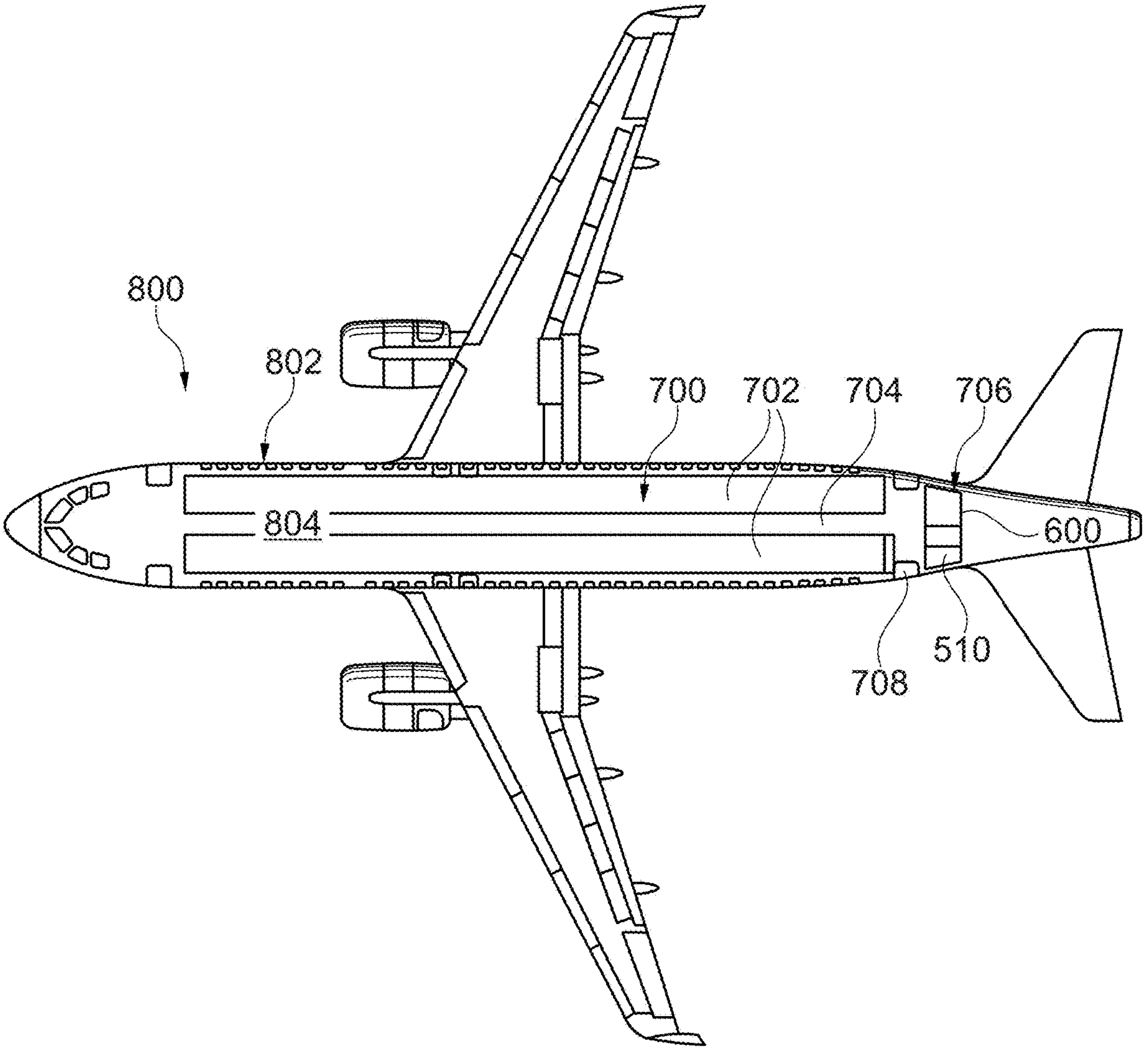
FIG. 17 shows an example of a cabin for an aircraft, and the aircraft itself.

FIG. 17 shows an example of a cabin 700 for an aircraft. The cabin 700 comprises at least one passenger seating zone 702 with a plurality of passenger seats. The cabin 700 also comprises at least one aisle zone 704 for allowing movement of the passengers inside the cabin. The cabin 700 further comprises at least one lavatory monument 706. The at least one lavatory monument 706 comprises at least one example of the lavatory arrangement 600 according to one of the examples above. The lavatory arrangement 600 comprises an example of the divider wall 510 between two adjacent lavatories.

As an option, the lavatory arrangement 600 is arranged in the vicinity of an aircraft door 708, e.g., an aft door.

The term "passenger seating zone" relates to the parts of the cabin in which seats are provided for passengers.

The term "aisle zone" relates to the parts of the cabin that act as corridors for movement onboard the aircraft.

The term "lavatory monument" relates to monuments and other arrangements in the cabin providing the restroom functions onboard the aircraft.

FIG. 17 also shows an example of an aircraft 800. The aircraft 800 comprises a fuselage 802 and a cabin space 804 arranged within the fuselage 802. Within the cabin space it is provided at least one example of the lavatory arrangement 600 according to one of the examples above; or the aircraft cabin 700 according to the examples above.

In an option, the lavatory arrangement 600 is arranged next to an aft door of the aircraft, e.g., near a pressure bulkhead of the fuselage.

Figure 18:
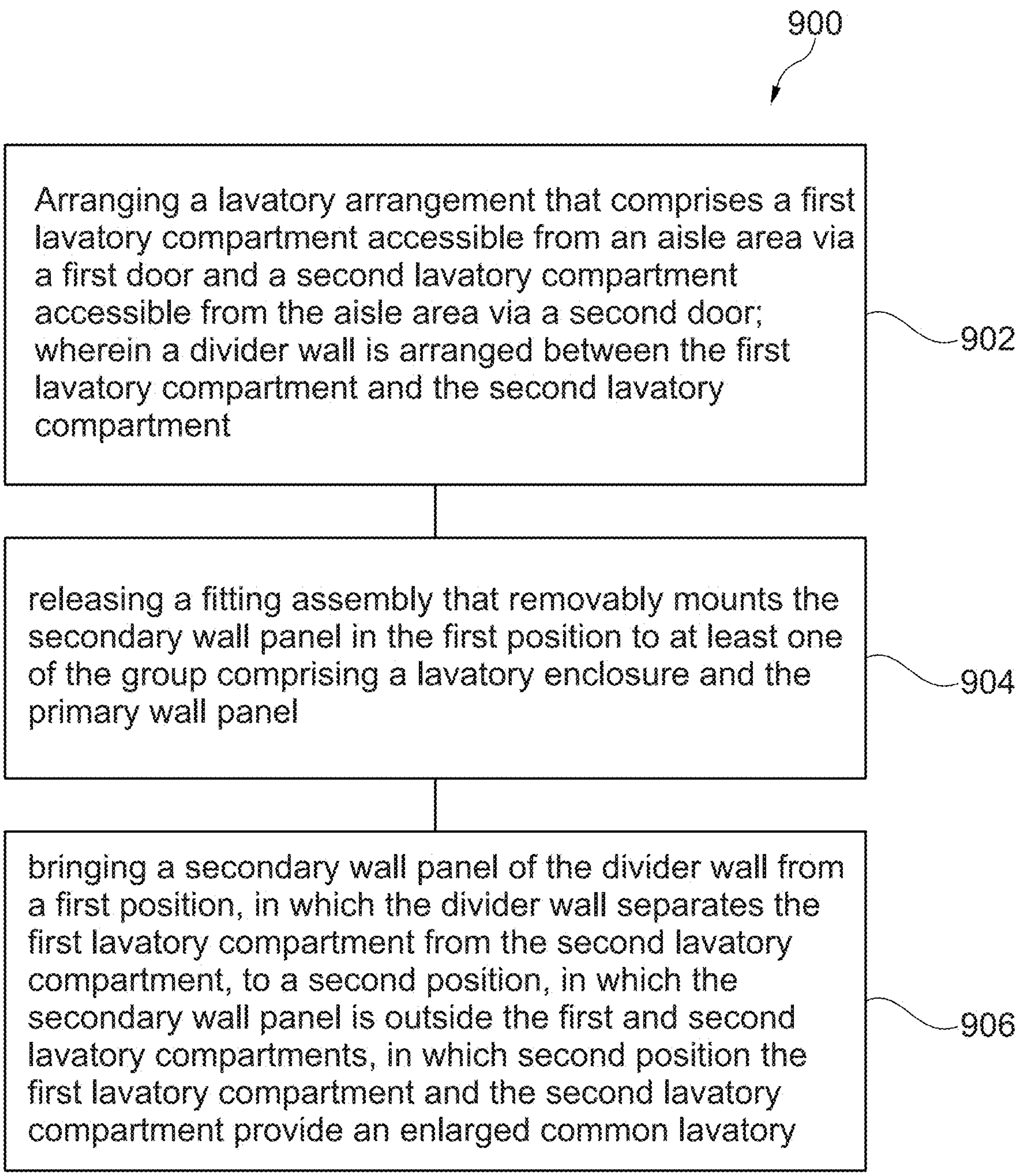
FIG. 18 shows basic steps of an example of a method for transforming a lavatory arrangement for an aircraft cabin.

FIG. 18 shows basic steps of an example of a method 900 for transforming a lavatory arrangement for an aircraft cabin. The method 900 comprises the following steps:

- In a first step 902, a lavatory arrangement is arranged that comprises a first lavatory compartment accessible from an aisle area via a first door and a second lavatory compartment accessible from the aisle area via a second door; a divider wall is arranged between the first lavatory compartment and the second lavatory compartment.
- In a second step 904, a fitting assembly is released that removably mounts the secondary wall panel in the first position to at least one of the group comprising: a lavatory enclosure and the primary wall panel.
- In a third step 906, a secondary wall panel of the divider wall is brought from a first position, in which the divider wall separates the first lavatory compartment from the second lavatory compartment, to a second position, in which the secondary wall panel is outside the first and second lavatory compartments, in which second position the first lavatory compartment and the second lavatory compartment provide an enlarged common lavatory.

In an example of the method, the step of bringing the partition wall in the second position comprises at least partly enclosing a part of the aisle area in front of the lavatory arrangement providing an additional separated space as an enlargement to the common lavatory for the use by passengers with reduced mobility.

Further, also the following examples are provided, which are numbered for easier reference.

Example 1: A divider wall for an aircraft lavatory arrangement in a cabin of an aircraft is provided. The divider wall comprises a primary wall panel, a secondary wall panel and a fitting assembly. The primary wall panel is configured to be fixedly arranged between a first lavatory and a second lavatory of a double lavatory arrangement. The secondary wall panel is configured to be removably arranged between the first and the second lavatory such that in an attached first position, the secondary wall panel and the primary wall panel provide a separation between the first and the second lavatory. The secondary wall panel is movable to a detached second position outside the lavatory arrangement in which second position a separation of the first and the second lavatory is cancelled. The fitting assembly is configured to removably mount the secondary wall panel in the first position to at least one of the group comprising a lavatory enclosure and the primary wall panel.

Example 2: Divider wall according to example 1, wherein the fitting assembly is configured to removably fix the secondary wall panel in the second position to at least one of the group comprising a cabin facing side of the lavatory enclosure and another monument within the cabin.

Example 3: Divider wall according to example 1 or 2, wherein the secondary wall panel comprises a first panel segment and a second panel segment. The first panel segment and the second panel segment are movably connected to each other.

Example 4: Divider wall according to example 3, wherein the first panel segment and the second panel segment are symmetric along a vertical axis of the vertical hinge.

Example 5: A lavatory arrangement (600) for an aircraft cabin, the arrangement comprising a first lavatory compartment accessible from an aisle area; and a second lavatory compartment accessible from the aisle area. An example of the divider wall according to one of the examples 1 to 4 is arranged between the first lavatory compartment and the second lavatory compartment. In the first position, the divider wall separates the first lavatory compartment from the second lavatory compartment. In the second position, the secondary wall panel is brought outside the first and second lavatory compartments, in which second position the first lavatory compartment and the second lavatory compartment provide an enlarged common lavatory.

Example 6: Lavatory arrangement according to example 5, wherein the first lavatory compartment is accessible from the aisle area via a first door, and the second lavatory compartment is accessible from the aisle area via a second door. In the second position, the secondary wall panel is arranged extending from the lavatory compartment towards a monument provided on an opposite side of the aisle area such that an additional space is provided in front of the first or second door separated from an adjacent aisle or seating space, which additional space is provided as an enlargement to the common lavatory.

Example 7: Lavatory arrangement according to example 5 or 6, wherein, in the second position, the secondary wall panel is attached to an opened distal edge of the first or the second door.

Example 8: A kit for converting a lavatory arrangement with two adjacent lavatories into a PRM-suitable enlarged lavatory is provided. The kit comprises a divider wall according to one of the examples 1 to 4 configured to replace an existing rigid divider wall between the two adjacent lavatories. The kit comprises a primary fitting to fixedly install the primary wall panel inside the lavatory arrangement.

Example 9: Kit according to example 8, wherein the fitting assembly of the divider wall comprises at least one holding device that is configured to removably mount the secondary wall panel in the second position to at least one of the group comprising a cabin facing side of the lavatory enclosure and another monument within the cabin.

Example 10: A cabin for an aircraft is provided. The cabin comprises at least one passenger seating zone with a plurality of passenger seats. The cabin also comprises at least one aisle zone for allowing movement of the passengers inside the cabin; and at least one lavatory monument. The at least one lavatory monument comprises at least one lavatory arrangement according to one of the examples 5 to 7.

Example 11: An aircraft is provided that comprises a fuselage; and a cabin space arranged within the fuselage. It is provided within the cabin space i) at least one lavatory arrangement according to one of the examples 5 to 7; or ii) an aircraft cabin according to example 10.

Example 12: A method for transforming a lavatory arrangement for an aircraft cabin is provided. The method comprises the following steps:

Arranging a lavatory arrangement that comprises a first lavatory compartment accessible from an aisle area via a first door and a second lavatory compartment accessible from the aisle area via a second door; a divider wall is arranged between the first lavatory compartment and the second lavatory compartment;

Releasing a fitting assembly that removably mounts the secondary wall panel in the first position to at least one of the group comprising a lavatory enclosure and the primary wall panel; and Bringing a secondary wall panel of the divider wall from a first position, in which the divider wall separates the first lavatory compartment from the second lavatory compartment, to a second position, in which the secondary wall panel is outside the first and second lavatory compartments, in which second position the first lavatory compartment and the second lavatory compartment provide an enlarged common lavatory.

It has to be noted that embodiments of the invention are described with reference to different subject matters. In particular, some embodiments are described with reference to method type claims whereas other embodiments are described with reference to the device type claims. However, a person skilled in the art will gather from the description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

A single processor or other unit may fulfil the functions of several items re-cited in the claims. The mere fact that certain measures are re-cited in mutually different dependent claims does not indicate that a combination of these measures cannot be used to advantage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabin for an aircraft, the cabin comprising:

at least one passenger seating zone with a plurality of passenger seats;

at least one aisle zone which is adjacent to the at least one passenger seating zone and which is configured to allow movement of the passengers inside the cabin; and at least one lavatory monument forming a lavatory arrangement, comprising:

a first lavatory compartment accessible from an aisle area via a first door;

a second lavatory compartment accessible from the aisle area via a second door;

wherein a movable bi-functional partition wall is arranged between the first lavatory compartment and the second lavatory compartment;

wherein the bi-functional partition wall is movable between a primary position and a secondary position;

wherein in the primary position, the bi-functional partition wall separates the first lavatory compartment from the second lavatory compartment, and in the secondary position, the bi-functional partition wall is brought into a position outside the first and second lavatory compartments, in which secondary position the first lavatory compartment and the second lavatory compartment provide an enlarged common lavatory;

wherein in the secondary position, the bi-functional partition wall is arranged at least partly outside the lavatory arrangement and at least partly within the aisle area outside the first lavatory compartment and the second lavatory compartment; and wherein, in the secondary position, the bi-functional partition wall is at least partly enclosing a part of the aisle area in front of the lavatory arrangement providing an additional separated space as an enlargement to the enlarged common lavatory.

2. The cabin according to claim 1, wherein, in the secondary position, the partition wall is arranged extending towards a monument provided on an opposite side of the aisle area such that an additional space is provided in front of the first or second door separated from an adjacent aisle or seating space, which additional space provides an enlargement to the common lavatory.

3. The cabin according to claim 1, wherein the partition wall comprises a main wall panel and an extension segment on a distal edge of the partition wall to extend an effective length of the partition wall in the secondary position;

wherein the extension segment is movable from a stored position to an extended position; and wherein the extension segment is:

a pivoting segment attached to the main wall panel pivotably around a vertical axis; or a translating segment attached to a distal front end of the main wall panel translatable in a telescoping manner.

4. The cabin according to claim 1, wherein a movable bridging segment is provided on the monument provided on the opposite side of the aisle area;

wherein the bridging segment is movable between a parked position and a deployed position; and wherein the partition wall is connectable to the bridging segment when the partition wall is in a secondary position of the partition wall and the bridging segment is in its a deployed position of the bridging segment.

5. The cabin according to claim 1, wherein the partition wall comprises at least two wall panel segments connected by a vertical hinge connection; and wherein, in the secondary position, the partition wall is extracted from the lavatory arrangement and folded along the vertical hinge connection and attached with a distal end such that an enclosed supplemental space partition is provided in front of the first door or the second door, which enclosed supplemental space section is provided as an apsis-like enlargement to the enlarged common lavatory.

6. The cabin according to claim 1, wherein the partition wall comprises at least two wall panel segments connected by a vertical hinge connection;

wherein, in the secondary position, the partition wall is extracted from the arranged lavatory arrangement folded along the vertical hinge connection and attached with a distal end of the partition wall to a cabin wall structure arranged to the side of the first or the second lavatory such that a supplemental space section adjacent to the first or second door is provided, which supplemental space is provided as an enlargement to the enlarged common lavatory.

7. The cabin according to claim 1, wherein, in the secondary position, the partition wall is arranged extending from the lavatory arrangement to a monument provided on an opposite side of the aisle area within the cabin;

wherein, for achieving the secondary position, in a completely pulled out state of the partition wall is movable with a proximal end of the partition wall from a location between the first and the second door towards a location on the opposite side of the first and the second door; and wherein, in the secondary position, the partition wall is connected with a proximal end of the partition wall to a portion of the lavatory arrangement that is arranged on a lateral side of the first or the second door such that an enlarged additional space is provided in front of the first and second door separated from an adjacent aisle or seating space of the cabin, which additional space is provided as an enlargement to the common lavatory.

8. The cabin according to claim 1, wherein, in the secondary position, the partition wall is arranged in front of the first or the second lavatory door; and wherein, the partition wall comprises two segments that are foldable connected along a vertical axis to fold in front of the first or second door in the secondary position.

9. The cabin according to claim 1, wherein the at least one aisle zone comprises at least one longitudinally arranged aisle; and wherein the first and second lavatory compartments are accessible from the aisle.

10. The cabin according to claim 1, wherein an entry zone is provided to be arranged next to an aircraft door; the entry zone comprising an entry aisle area; and wherein the first and second lavatory compartments are accessible from the entry aisle area.

11. A method for transforming a lavatory arrangement for an aircraft cabin, comprising the following steps:

arranging a lavatory arrangement comprising a first lavatory compartment accessible from an aisle area via a first door, and a second lavatory compartment accessible from the aisle area via a second door; and moving a bi-functional partition wall arranged between the first lavatory compartment and the second lavatory compartment from a primary position, in which the bi-functional partition wall separates the first lavatory compartment from the second lavatory compartment, to a secondary position; wherein, to move the partition wall, the wall is released and then moved to provide the enlarged lavatory, and further placed in the aisle area where the partition wall is fixed; wherein in the secondary position, the bi-functional partition wall is brought into a position outside the first and second lavatory compartments; wherein, in the secondary position, the first lavatory compartment and the second lavatory compartment provide an enlarged common lavatory; and wherein in the secondary position, the bi-functional partition wall is arranged at least partly outside the lavatory arrangement and within the aisle area outside the first lavatory compartment and the second lavatory compartment.

12. A lavatory arrangement for an aircraft cabin, the arrangement comprising:

a first lavatory compartment accessible from an aisle area via a first door; and a second lavatory compartment accessible from the aisle area via a second door;

a divider wall arranged between the first lavatory compartment and the second lavatory compartment, comprising:

a primary wall panel;

a secondary wall panel; and a fitting assembly;

wherein the primary wall panel is configured to be fixedly arranged between a first lavatory and a second lavatory of a double lavatory arrangement;

wherein the secondary wall panel is configured to be removably arranged between the first and the second lavatory such that in an attached first position, the secondary wall panel and the primary wall panel provide a separation between the first and the second lavatory;

wherein the secondary wall panel is movable to a detached second position outside the lavatory arrangement in which a separation of the first and the second lavatory is cancelled; and wherein the fitting assembly is configured to removably mount the secondary wall panel in the first position to at least one of the group comprising: a lavatory enclosure and the primary wall panel, wherein in the first position, the divider wall separates the first lavatory compartment from the second lavatory compartment;

wherein in the second position, the secondary wall panel is brought outside the first and second lavatory compartments, in which second position the first lavatory compartment and the second lavatory compartment provide an enlarged common lavatory;

wherein the secondary wall panel comprises at least two wall panel segments connected by a vertical hinge connection; and wherein, in the detached second position outside, the secondary wall panel is extracted from the aircraft lavatory arrangement folded along the vertical hinge connection and attached with a distal end of the secondary wall panel to a cabin wall structure arranged to the side of the first or the second lavatory such that a supplemental space section adjacent to the first or second door is provided, which supplemental space is provided as an enlargement to the enlarged common lavatory.

13. The lavatory arrangement according to claim 12, wherein the fitting assembly is configured to removably fix the secondary wall panel in the second position to at least one of the group comprising: a cabin facing side of the lavatory enclosure and another monument within the cabin; and wherein the secondary wall panel comprises a first panel segment and a second panel segment; and the first panel segment and the second panel segment are movably connected to each other.

14. The lavatory arrangement according to claim 13, wherein the first panel segment and the second panel segment are symmetric along a vertical axis of the vertical hinge.

15. A cabin for an aircraft, the cabin comprising:

at least one passenger seating zone with a plurality of passenger seats;

at least one aisle zone configured to allow movement of the passengers inside the cabin; and at least one lavatory monument;

wherein the at least one lavatory monument comprises at least one lavatory arrangement according to claim 12;

wherein, in the second position, the secondary wall panel is arranged extending from the first lavatory compartment or the second lavatory compartment towards a monument provided on an opposite side of the aisle area such that an additional space is provided in front of the first or second door separated from an adjacent aisle or seating space, which additional space is provided as an enlargement to the common lavatory; and wherein, in the second position, the secondary wall panel is attached to a distal edge of the first or the second door.

* * * * *